US010922325B2

(12) United States Patent
Yamato et al.

(10) Patent No.: US 10,922,325 B2
(45) Date of Patent: Feb. 16, 2021

(54) MATCHING DEVICE, MATCHING METHOD, AND PROGRAM

(71) Applicant: OMRON Corporation, Kyoto (JP)

(72) Inventors: Tetsuji Yamato, Yokohama (JP); Hiroshi Imai, Koma (JP)

(73) Assignee: OMRON Corporation, Kyoto (JP)

( * ) Notice: Subject to any disclaimer, the term of this patent is extended or adjusted under 35 U.S.C. 154(b) by 31 days.

(21) Appl. No.: 16/345,756

(22) PCT Filed: Sep. 21, 2017

(86) PCT No.: PCT/JP2017/034018
§ 371 (c)(1),
(2) Date: Apr. 29, 2019

(87) PCT Pub. No.: WO2018/088040
PCT Pub. Date: May 17, 2018

(65) Prior Publication Data
US 2019/0266165 A1 Aug. 29, 2019

(30) Foreign Application Priority Data

Nov. 14, 2016 (JP) ................. 2016-221733

(51) Int. Cl.
*G06F 16/2457* (2019.01)
*G06F 16/23* (2019.01)
(Continued)

(52) U.S. Cl.
CPC ........ *G06F 16/24578* (2019.01); *G06F 16/00* (2019.01); *G06F 16/2379* (2019.01); *G06F 16/248* (2019.01)

(58) Field of Classification Search
None
See application file for complete search history.

(56) References Cited

U.S. PATENT DOCUMENTS

2014/0372561 A1* 12/2014 Hisano ................. G08G 1/0112
709/217
2016/0210862 A1 7/2016 Hisano

FOREIGN PATENT DOCUMENTS

JP H10-003480 A 1/1998
JP H11-4574 A 2/1999
(Continued)

OTHER PUBLICATIONS

An English translation of the International Search Report("ISR") of PCT/JP2017/034018 dated Nov. 21, 2017.
(Continued)

*Primary Examiner* — Charles E Anya
(74) *Attorney, Agent, or Firm* — Metrolex IP Law Group, PLLC

(57) ABSTRACT

A matching apparatus includes: a sensor-side metadata acquisition unit that acquires sensor-side metadata; an application-side metadata acquisition unit that acquires application-side metadata; a matching unit that performs matching between the sensor-side metadata and the application-side metadata in which a first related term that is related to a term in the acquired sensor-side metadata and a second related term that is related to a term in the acquired application-side metadata are in common with each other, and extracts a sensor candidate; and a dataflow control command instruction unit that transmits a dataflow control command that includes information that specifies the sensor extracted by the matching unit and an application.

19 Claims, 19 Drawing Sheets

(51) Int. Cl.
*G06F 16/248* (2019.01)
*G06F 16/00* (2019.01)

(56) References Cited

FOREIGN PATENT DOCUMENTS

| | | |
|---|---|---|
| JP | 2005-202485 A | 7/2005 |
| JP | 5445722 B1 | 3/2014 |

OTHER PUBLICATIONS

The Written Opinion("WO") of PCT/JP2017/034018 dated Nov. 21, 2017.
Mutao Huang et al., "Using SOA and RIAs for water data discovery and retrieval", Environmental Modelling & Software, May 13, 2011, pp. 1309-1324, vol. 26, No. 11, Elsevier; Relevance is indicated in the extended European search report dated Nov. 27, 2019.
The extended European search report dated Nov. 27, 2019 in a counterpart European patent application.

* cited by examiner

FIG. 4

```
┌─────────────────────────────────┐ ┌─────────────────────────────────┐
│ Related term and                │ │ Related term and dissimilarity F│
│ dissimilarity F for term X      │ │ for term Y in application-side  │
│ in sensor-side metadata         │ │ metadata                        │
│                                 │ │                                 │
│ F(term X - related term c)      │ │ F(term Y - related term f) = 1.20│
│ = 1.20                          │ │ F(term Y - related term g) = 1.10│
└─────────────────────────────────┘ └─────────────────────────────────┘   Less than
─────────────────────────────────────────────────────────────────────     threshold value 1
  F(term X - related term g) = 0.90   F(term Y - related term d) = 0.80
 ┌─────────────────────────────────┐ ┌─────────────────────────────────┐
 │ F(term X - related term a) = 0.80│ │ F(term Y - related term a) = 0.60│  Related term
 └─────────────────────────────────┘ └─────────────────────────────────┘  used in matching
  F(term X - related term b) = 0.60   F(term Y - related term e) = 0.60

Match between sensor-side metadata and application-side metadata
```

FIG. 5

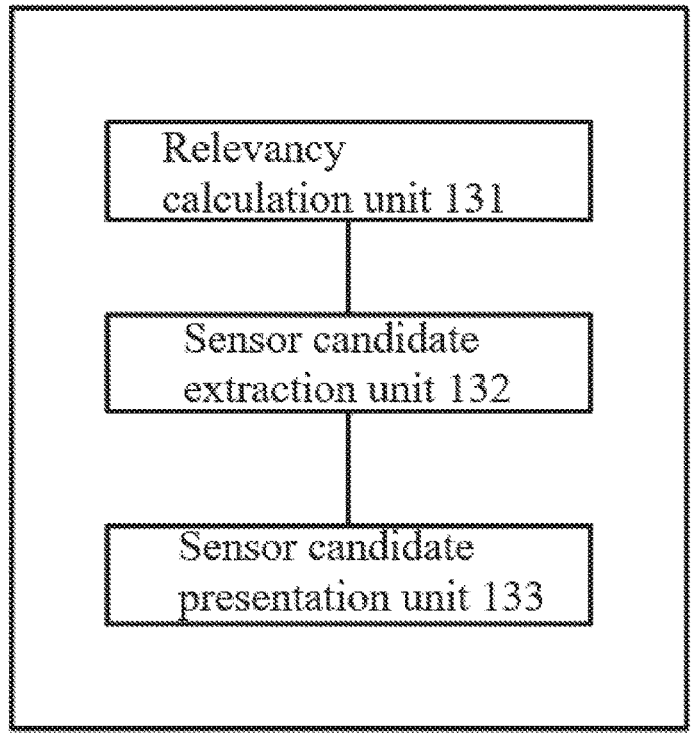

| Application-side metadata | Sensor candidate | Sensor-side metadata | Rank | Dissimilarity |
|---|---|---|---|---|
| Pressure sensor | Sensor A | Blood pressure meter | 1 | 0.5 |
| | Sensor B | Absolute pressure sensor | 2 | 0.9 |

FIG. 9

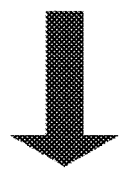

Related term and dissimilarity F for term X in sensor-side metadata

F( term X - related term c) = 1.30
F( term X - related term a) = 1.10
F( term X - related term b) = 0.60
F( term X - related term g) = 0.60

Related term and dissimilarity F for term Y in application-side metadata

F( term Y - related term f) = 1.25
F( term Y - related term g) = 1.25
F( term Y - related term d) = 0.80
F( term Y - related term a) = 0.60
F( term Y - related term e) = 0.60

Less than threshold value 1

Related term used in matching

No related term in common with dissimilarity F less than threshold value 1

Change threshold value from 1 to 1.2

Related term and dissimilarity F for term X in sensor-side metadata

F( term X - related term c) = 1.30
F( term X - related term a) = 1.10
F( term X - related term b) = 0.60
F( term X - related term g) = 0.60

Related term and dissimilarity F for term Y in application-side metadata

F( term Y - related term f) = 1.25
F( term Y - related term g) = 1.25
F( term Y - related term d) = 0.80
F( term Y - related term a) = 0.60
F( term Y - related term e) = 0.60 less than threshold value 1.2

Related term used in matching

Match between sensor-side metadata and application-side metadata

| Term | Related term | Dissimilarity |
|---|---|---|
| Pressure sensor | Air pressure sensor | 0.7 |
| | Blood pressure meter | 0.5 |
| | Strain gauge | 1.2 |
| | ⋮ | ⋮ |

FIG. 15

| Application-side metadata | Sensor candidate | Sensor-side metadata | Rank | Dissimilarity |
|---|---|---|---|---|
| Pressure sensor | Sensor B | Absolute pressure sensor | 1 | 0.4 |

FIG. 16

| Term | Related term | Dissimilarity | Co-occurring term |
|---|---|---|---|
| Pressure sensor | Air pressure sensor | 0.2 | Weather |
| | Blood pressure meter | 1.0 | Weather |
| | Strain gauge | 1.2 | |
| | ⋮ | ⋮ | |

FIG. 17

| Term | Related term | Dissimilarity | Co-occurring term | Contract establishment count |
|---|---|---|---|---|
| Pressure sensor | Air pressure sensor | 0.1 | Weather | 1 |
|  | Blood pressure meter | 1.0 | Weather | 0 |
|  | Strain gauge | 1.2 |  |  |

FIG. 20

| Application-side metadata | Sensor candidate | Sensor-side metadata | Rank | Dissimilarity sum value |
|---|---|---|---|---|
| Pressure sensor | Sensor A | Blood pressure meter | 1 | 0.5 |
| | Sensor B | Absolute pressure sensor | 2 | 0.9 |
| | Sensor C | Load sensor | 3 | 1.50 |

MATCHING DEVICE, MATCHING METHOD, AND PROGRAM

TECHNICAL FIELD

The present invention relates to technology for performing matching between a sensor side, which provides sensing data detected by sensors, and an application side, which provides services using the sensing data, with use of metadata from the two sides, and for extracting candidate sensors that are capable of providing sensing data that satisfies the needs of an application.

RELATED ART

So-called sensor network technology has been under consideration. With this technology, sensor devices (hereinafter, also simply called "sensors") that have a sensing function and a communication function are disposed at various locations and on various pieces of industrial equipment, and the sensor devices are networked in order to enable the collection, management, and seamless use of sensing data.

Normally, a sensor is disposed in order to collect data that is needed by an owner of the sensor. Therefore, when the owner is not collecting data, such a sensor often is not used (the sensor itself is not operating, or even if the sensor is operating, sensing data is not being used). The sensing data therefore has low distributability, and regardless of how significant the data is to a third party, analysis and usage of such data stops at the owner of the sensor. This has consequently led to overlapping investment in equipment and network congestion caused by communication with sensors disposed by various owners.

So-called IoT (Internet of Things) technology has also been under consideration. With this technology, information regarding many things that exist in the world is combined on the Internet in order to generate new value, thus creating expectation for the seamless expansion of various services in social infrastructure and the like. Producing value from the IoT requires knowledge of the states of the things that are connected to the Internet, and sensing and communication become important component technology.

Upon forming a sensor network such as that described above, the large amount of sensing data collected around the world needs to be made available to various businesses and organizations according to their own objectives. One example is the processing of data on an application server that is capable of processing big data in order to produce and provide added value, and another example is the vitalization of sensing data transactions to bring about economic effects. For example, the owner of a sensor can gain value by permitting temporary usage of the sensor to a data user or providing sensing data to them. There is also an advantage to the data user in that they can obtain necessary data inexpensively due to not needing investment for installing sensors.

In view of this, as disclosed in Patent Document 1, an invention has been proposed regarding a mechanism for appropriately distributing a resource such as sensing data.

In the invention disclosed in Patent Document 1, matching is performed between application-side metadata and sensor-side metadata, and applications that require sensing data are associated with sensors that can provide that data. A dataflow control command is then transmitted to an apparatus that manages a sensor. This therefore promotes the distribution of sensing data in consideration of various conditions and improves the service, and moreover is beneficial to both the data provider and user. Here, "metadata" refers to information used in server searching and matching, "sensor-side metadata" refers to information regarding attributes of a sensor and sensing data obtained by that sensor, and "application-side metadata" refers to information regarding attributes of an application itself and sensing data required by that application. Also, the dataflow control command is command information that includes information for specifying the sensor that is the data provision source and the application that is the data use destination, and that instructs the distribution of data from the data provision source to the data use destination.

RELATED ART DOCUMENT

Patent Document

Patent Document 1: JP 5445722B

SUMMARY OF THE INVENTION

Problem to be Solved by the Invention

Also, with the invention disclosed in Patent Document 1, there are thought to be many cases where sensor-side metadata and application-side metadata are registered by users, and also many cases of being registered by entrusted persons.

However, the terms that are registered in the sensor-side metadata and the application-side metadata are not uniform, but rather are diverse to a certain extent. For example, a sensor for measuring the temperature may be named "temperature sensor" in some cases, and "thermometer" or the like in other cases. In this way, various expressions are conceivable due to variation in expression, synonyms, synonymous terms, generic concepts, specific concepts, and the like.

Accordingly, if focus is placed on only the registered terms when matching is performed between sensor-side metadata and application-side metadata, there are cases where it is not possible to reflect the data distribution intentions of the sensor-side or application-side user, and an opportunity to match sensor-side metadata with application-side metadata is lost.

However, if the number of matching opportunities is increased, sensors that are completely unnecessary to the application side will be extracted as matching candidates, thus lowering the precision in matching.

In view of this, the present invention was achieved in light of the foregoing problems, and an object thereof is to provide technology for increasing the number of opportunities for matching between sensor-side metadata and application-side metadata while also suppressing a reduction in matching precision.

Means for Solving the Problems

One aspect of this invention is a matching apparatus including: a sensor-side metadata acquisition unit that acquires sensor-side metadata that is information regarding a sensor that outputs sensing data; an application-side metadata acquisition unit that acquires application-side metadata that is information regarding an application that provides a service with use of the sensing data; a matching unit that performs matching between the sensor-side metadata and the application-side metadata in which a first related term that is related to a term in the acquired sensor-side metadata and a second related term that is related to a term in the acquired application-side metadata are in common with each, and extracts a candidate sensor that can provide sensing data that matches needs of the application; and an instruction unit that transmits, to a sensor management apparatus that manages the sensor, a dataflow control command that includes information that specifies the sensor extracted by the matching unit and the application.

According to this configuration, it is possible to reflect the data distribution intentions of the sensor-side or application-side user, and also possible to increase the number of opportunities for matching between sensor-side metadata and application-side metadata, and suppress a reduction in matching precision.

Furthermore, due to being able to increase the number of matching opportunities and also suppress a reduction in matching precision, it is consequently possible to output an appropriate number of dataflow control commands, suppress network communication traffic, and effectively utilize resources in the system overall.

Also, a configuration is possible in which the matching unit includes a relevancy calculation unit that calculates at least either one of a first relevancy between the term in the sensor-side metadata and the first related term and a second relevancy between the term in the application-side metadata and the second related term, and a sensor candidate extraction unit that, with use of at least either one of the first related term and the first relevancy or the second related term and the second relevancy, performs matching between the sensor-side metadata and the application-side metadata, and extracts the candidate sensor that can provide sensing data that matches needs of the application.

According to this configuration, relevancy between a term and a related term is introduced, thus making it possible to create an indicator of the extent of matching between the sensor-side metadata and the application-side metadata.

Also, a configuration is possible in which the sensor candidate extraction unit performs matching between the sensor-side metadata and the application-side metadata with use of the first related term having a first relevancy that is in a predetermined range and the first relevancy, or with use of the second related term having a second relevancy that is in a predetermined range and the second relevancy.

According to this configuration, matching is performed with use of a related term having a relevancy that is in a predetermined range, thus making it possible to suppress an increase in the number of related terms that are in common between a sensor-side metadata term and an application-side metadata term, and making it possible to perform more precise matching.

Also, a configuration is possible in which the matching apparatus further includes: a range setting unit that sets the predetermined range of the first relevancy to be used with respect to the first related term, or the predetermined range of the second relevancy to be used with respect to the second related term.

According to this configuration, the range of relevancy that is to be used can be set to a desired range of relevancy, and the number of related terms that are to be used in matching can be adjusted.

Also, a configuration is possible in which in a case where a contract is established with an application-side user through matching, the range setting unit sets, as a range of relevancy of a related term to be used in subsequent matching processing, a range of relevancy of a related term that was used when the contract was established.

According to this configuration, the range of relevancy of a related term that was used when a contract was established is used when subsequent matching processing is performed, and therefore the range of relevancy of a related term can be set to an appropriate range.

Also, a configuration is possible in which the sensor candidate extraction unit corrects the first relevancy or the second relevancy with consideration given to co-occurrence with the term in the sensor-side metadata or the application-side metadata.

According to this configuration, terms that co-occur with each other in the sensor-side metadata or the application-side metadata are terms that have a high relevancy with each other, and by correcting the relevancy of a related term with consideration given to such co-occurrence, it is possible to raise the matching precision. Note that co-occurrence of terms can also be said to be an indicator of relevancy of the present invention.

Also, a configuration is possible in which in a case where the term in the sensor-side metadata and the first related term or the term in the application-side metadata and the second related term were previously used in matching and a contract was established with an application-side user through the matching, the sensor candidate extraction unit corrects the first relevancy or the second relevancy according to a frequency of the contract establishment.

According to this configuration, among previous matching results, terms that were used when a contract was established can be inferred to have a high relevancy with each other, and therefore by using the frequency of contract establishment when correcting relevancy, it is possible to raise the matching precision. Note that the frequency of contract establishment can also be said to be an indicator of relevancy in the present invention.

Also, a configuration is possible in which the matching apparatus further includes: a term database in which a term used in the sensor-side metadata or the application-side metadata, a related term that is related to the term, and a relevancy between the term and the related term are stored in association with each other; and a term database updating unit that updates the term database with use of a term of the sensor-side metadata or the application-side metadata that was newly used in matching, the first or second related term, or the first or second relevancy that was newly calculated.

According to this configuration, by creating a database of calculated relevancy, it is possible to reduce the number of terms for which relevancy is calculated when matching is performed at a later time.

Also, a configuration is possible in which the matching apparatus further includes: a sensor candidate presentation unit that presents information regarding the extracted candidate sensor to the application-side user.

According to this configuration, due to presenting the sensor that was extracted as the candidate sensor to the application-side user, the application-side user can check whether or not it is a desired sensor.

Also, a matching method according to this invention includes: acquiring sensor-side metadata that is information regarding a sensor that outputs sensing data; acquiring application-side metadata that is information regarding an application that provides a service with use of the sensing data; performing matching between the sensor-side metadata and the application-side metadata in which a first related term that is related to a term in the acquired sensor-side metadata and a second related term that is related to a term in the acquired application-side metadata are in common with each, and extracting a candidate sensor that can provide sensing data that matches needs of the application; and transmitting, to a sensor management apparatus that manages the sensor, a dataflow control command that includes information that specifies the extracted sensor and the application.

According to this configuration, it is possible to reflect the data distribution intentions of the user on the sensor side or the application side, and also possible to increase the number of opportunities for matching between sensor-side metadata and application-side metadata, and suppress a reduction in matching precision.

Furthermore, due to being able to increase the number of matching opportunities and also suppress a reduction in matching precision, it is consequently possible to output an appropriate number of dataflow control commands, suppress network communication traffic, and effectively utilize resources in the system overall.

Also, a program according to this invention causes a computer to execute: a process of acquiring sensor-side metadata that is information regarding a sensor that outputs sensing data; a process of acquiring application-side metadata that is information regarding an application that provides a service with use of the sensing data; a process of performing matching between the sensor-side metadata and the application-side metadata in which a first related term that is related to a term in the acquired sensor-side metadata and a second related term that is related to a term in the acquired application-side metadata are in common with each, and extracting a candidate sensor that can provide sensing data that matches needs of the application; and a process of transmitting, to a sensor management apparatus that manages the sensor, a dataflow control command that includes information that specifies the extracted sensor and the application.

According to this configuration, it is possible to reflect the data distribution intentions of the user on the sensor side or the application side, and also possible to increase the number of opportunities for matching between sensor-side metadata and application-side metadata, and suppress a reduction in matching precision.

Furthermore, due to being able to increase the number of matching opportunities and also suppress a reduction in matching precision, it is consequently possible to output an appropriate number of dataflow control commands, suppress network communication traffic, and effectively utilize resources in the system overall.

Effects of the Invention

The present invention makes it possible to increase the number of opportunities for matching between sensor-side metadata and application-side metadata, and also makes it possible to suppress a reduction in matching precision.

BRIEF DESCRIPTION OF THE DRAWINGS

FIG. 4 is a diagram for illustrating processing performed by the sensor candidate extraction unit 132.
FIG. 5 is a block diagram of the matching unit 13.
FIG. 9 is a diagram for illustrating a first modified example of the first embodiment.
FIG. 15 is a diagram showing an example of presenting sensor candidates to an application-side user based on the example shown in FIG. 14.
FIG. 16 is a diagram showing an example of the term database 6 registered by the term database updating unit 135.
FIG. 17 is a diagram showing an example of the term database 6 registered by the term database updating unit 135.
FIG. 20 is a diagram showing an example of presenting sensor candidates to an application-side user based on the example shown in FIG. 19.

EMBODIMENTS OF THE INVENTION

Embodiments of the present invention will be described with reference to the drawings.

In the embodiments of the present invention, in order to effectively use information on things that are connected to a network and constitute an IoT, matching is performed between a sensor side, which provides sensing data detected by sensors, and an application side, which provides a service using the sensing data, with use of metadata from the two sides, and candidate sensors that can provide sensing data that satisfies the needs of an application are extracted. Also, examples will be described in which when a match is found between sensor-side metadata and application-side metadata, sensing data is distributed from the sensor side to the application side.

First Embodiment

The following describes a first embodiment of the present invention.

Figure 1:
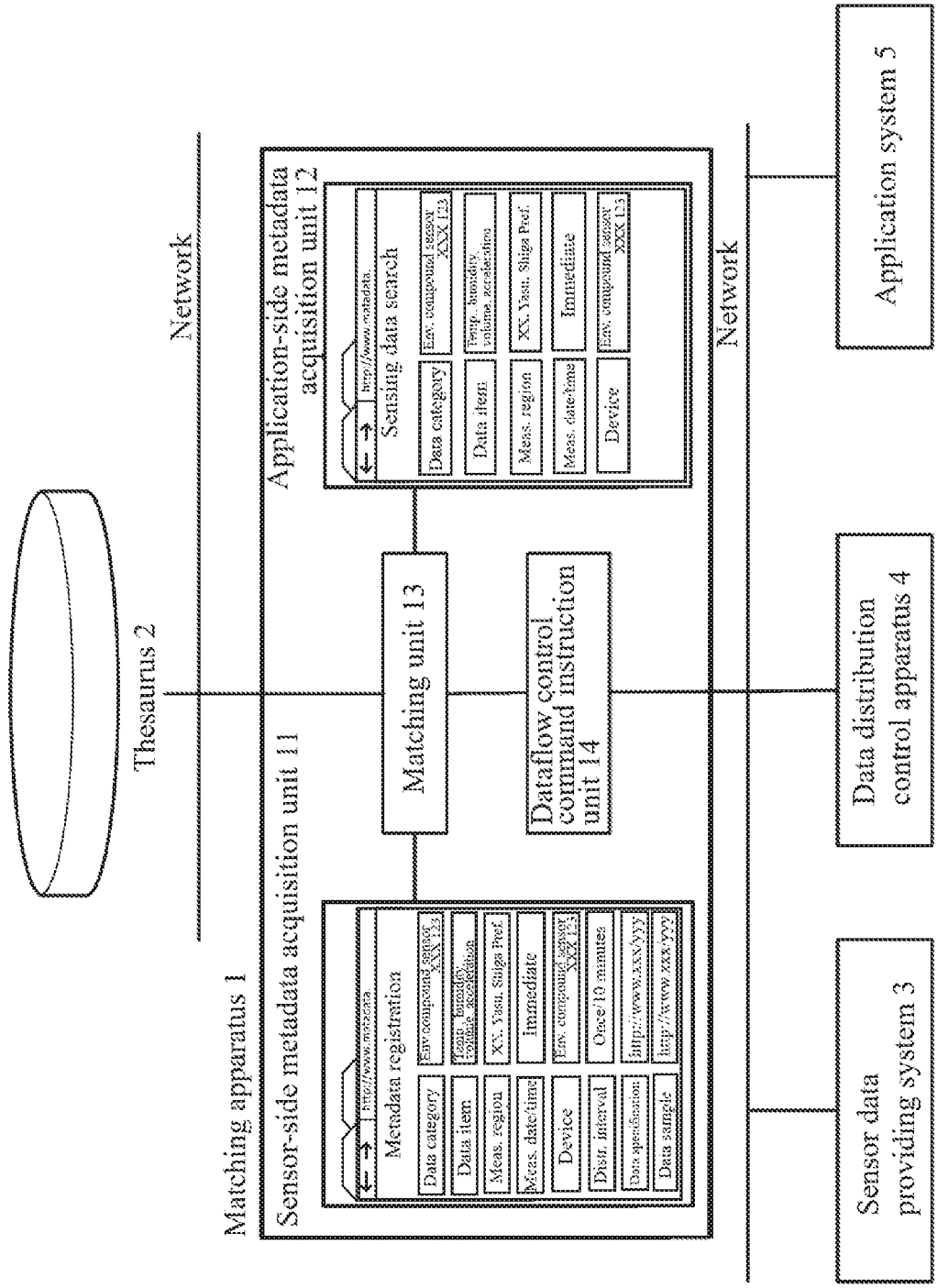
FIG. 1 is a block diagram of a first embodiment.

FIG. 1 is a block diagram of the first embodiment. In FIG. 1, 1 denotes a matching apparatus, 2 denotes a thesaurus, 3 denotes a sensor data providing system, 4 denotes a data distribution control apparatus (Distributor), and 5 denotes an application system.

The thesaurus 2 is a systematized thesaurus/dictionary database that classifies terms (words, etc.) based on generic-specific relationships, part-whole relationships, synonymous relationships, quasi-synonymous relationships, co-occurrence relationships, and the like between terms (words, etc.). Note that the present embodiment describes an example in which the matching apparatus 1 and the thesaurus 2 are connected via network, but the matching apparatus 1 may include the thesaurus 2.

The sensor data providing system 3 is a system that provides sensing data acquired by sensors.

The data distribution control apparatus (Distributor) 4 has functions for receiving sensing data from the sensor data providing system 3 and distributing sensing data to the application system 5, in accordance with later-described dataflow control commands.

The application system 5 is a system that provides a service using sensing data provided by the sensor data providing system 4.

In the example described below, the matching apparatus 1, the sensor data providing system 3, the data distribution control apparatus 4, and the application system 5 are connected via a network.

The matching apparatus 1 includes a sensor-side metadata acquisition unit 11, an application-side metadata acquisition unit 12, a matching unit 13, and a dataflow control command instruction unit 14.

The sensor-side metadata acquisition unit 11 acquires sensor-side metadata, which is information regarding a sensor that outputs sensing data.

Here, a sensor is a device that detects some sort of physical quantity and change thereof, and records or outputs such data as sensing data. Typical examples of such a sensor include a position sensor (GPS), an acceleration sensor, and a pressure sensor, but a camera, a microphone, an input system, and the like can also be said to be sensors.

Sensor-side metadata refers to information regarding attributes of a sensor and sensing data obtained by that sensor, and is for use in later-described matching. Examples of sensor-side metadata items include a data category, a data item, a measurement region, a measurement date/time, a device, a distribution interval, and a data specification. For example, "indoor environment measurement" is described as the data category, "temperature, humidity, volume, acceleration" is described as the data item, "Shiga Prefecture . . . " is described as the measurement region, "immediate" is described as the measurement date/time, "device name" is described as the device, "Once/10 minutes" is described as the distribution interval, and "http://WWW.XXX" is described as the data specification. In the following description, it is assumed that the words such as nouns and numerical counts described as items in the sensor-side metadata are simply described as sensor-side metadata terms. Note when there is a group of words, such as the case of a geographical name, there are cases where morphological analysis or the like is used to divide the group of words into words that have respective meanings for usage.

Also, the sensor-side metadata acquisition unit 11 can have various configurations. For example, there is a method of storing the aforementioned metadata in a database that can be accessed from the matching apparatus 1. In this case, metadata necessary for matching processing is already in the database, and therefore it is sufficient that the trigger for acquisition is an event notification given from the sensor side or the application side. Furthermore, there is also a configuration in which a sensor-side metadata database does not exist. In this case, metadata is transmitted from an application or a sensor management apparatus that detected the generation of an event.

The application-side metadata acquisition unit 12 acquires application-side metadata, which is information regarding applications that provide services using sensing data.

Here, application-side metadata refers to information regarding the attributes of an application itself and sensing data needed by that application. Examples of application-side metadata items include a data category, a data item, measurement region, a measurement date/time, and a device. For example, "environment measurement" is described as the data category, "temperature, humidity" is described as the data item, "Shiga Prefecture . . . " is described as the measurement region, "immediate" is described as the measurement date/time, and "device name" is described as the device. In the following description, it is assumed that the words such as nouns and numerical counts described as items in the application-side metadata are simply described as application-side metadata terms. Note when there is a group of words, such as the case of a geographical name, there are cases where morphological analysis or the like is used to divide the group of words into words that have respective meanings for usage.

The application-side metadata acquisition unit 12 can have various configurations. For example, there is a method of storing the aforementioned metadata in a database that can be accessed from the matching apparatus 1. In this case, metadata necessary for matching processing is already in the database, and therefore it is sufficient that the trigger for acquisition is an event notification given from the sensor side or the application side. Furthermore, there is also a configuration in which an application-side metadata database does not exist. In this case, the application-side user acquires application-side metadata that satisfies the needs of an application and that is created when searching for a desired sensor.

The matching unit 13 performs matching between sensor-side metadata and application-side metadata in which a related term that is related to a term in acquired sensor-side metadata (hereinafter, sometimes also called a first related term) and a related term that is related to a term in acquired application-side metadata (hereinafter, sometimes also called a second related term) are in common with each other, and extracts candidate sensors that can provide sensing data that satisfies the needs of an application. Note that related term refers to a term that is a more generic or specific concept of a term in sensor-side metadata or application-side metadata, is in a synonymous relationship therewith, or is in a quasi-synonymous relationship therewith, for example.

The matching unit 13 searches the thesaurus 2 for related terms that are related to the terms in the items of the sensor-side metadata. The matching unit 13 similarly searches the thesaurus 2 for related terms that are related to the terms in the items of the application-side metadata. If the found related terms include a common related term in both the sensor-side metadata and the application-side metadata, matching is performed between the sensor-side metadata and the application-side metadata that correspond to the common related term, and candidate sensors that can provide sensing data that satisfies the needs of an application are extracted.

It is not often the case that terms in the metadata registered by the sensor-side and application-side user match completely. However, the application-side user does not necessarily desire only a sensor that completely matches a term registered by the user, and it is thought that there are often cases where a sensor represented by a term that is a more generic or specific concept of the registered metadata term, in a synonymous relationship therewith, or in a quasi-synonymous relationship therewith for example will satisfy the application-side user's needs.

In view of this, in the present embodiment, the matching unit 13 extracts, as candidates, sensors that have a possibility of satisfying the application-side user's needs, and therefore the sensor-side metadata and the application-side metadata that are used in matching is extended to sensor-side metadata and application-side metadata in which a related term that is related to a sensor-side metadata term and a related term that is related to an application-side metadata term are in common with each other, thus increasing the number of matching opportunities while also suppressing a reduction in matching precision.

Also, when searching for related terms that are related to a sensor-side metadata term and related terms that are related to an application-side metadata term, if even related terms having low relevancy are used, the number of related terms that are in common with the sensor-side metadata term and the application-side metadata term increases, thus not only increasing the processing load, but also having a risk of reducing the matching precision. In view of this, if it is possible to know to the extent to which a sensor-side metadata term or an application-side metadata term is related to a related term, and to limit the related terms that are used, then matching can be performed with higher precision.

Figure 2:
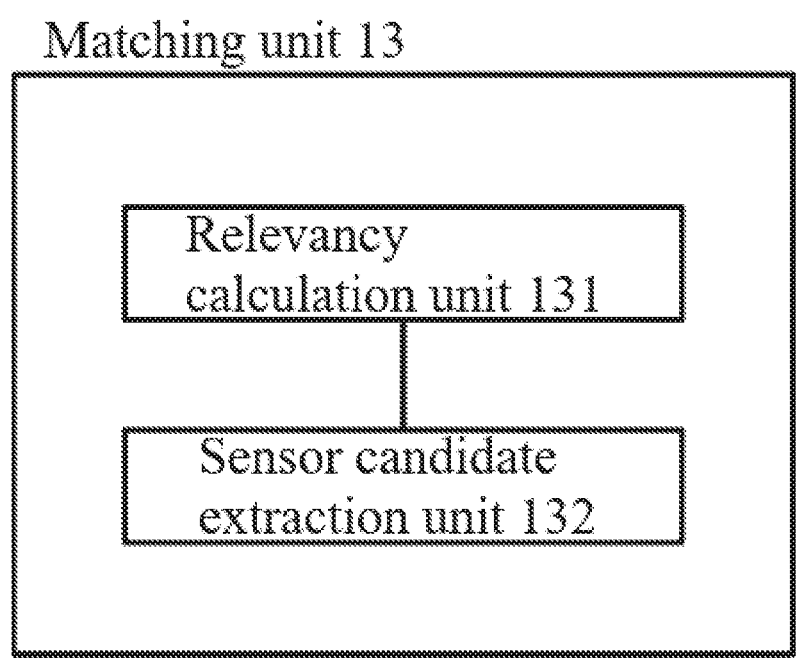
FIG. 2 is a block diagram of a matching unit 13.

In view of this, in the first embodiment, the concept of relevancy of a related term is introduced to the matching unit 13. FIG. 2 is a block diagram of the matching unit 13.

As shown in FIG. 2, the matching unit 13 includes a relevancy calculation unit 131 and a sensor candidate extraction unit 132. Hereinafter, the relevancy calculation unit 131 and the sensor candidate extraction unit 132 will be described using an example shown in FIG. 3.

The relevancy calculation unit 131 calculates the relevancy between terms in the items of the sensor-side metadata and the related terms registered in the thesaurus 2 (first relevancy), and the relevancy between terms in the items of the application-side metadata and the related terms registered in the thesaurus 2 (second relevancy).

Here, relevancy refers to how similar or related terms are to each other. The relevancy calculated by the relevancy calculation unit 131 can be calculated using any type of method or any conventional method, as long as it is possible to calculate an extent indicating how similar or related terms are to each other. One example of a conventional method is the relevancy calculation method described in the document "Automatic Extraction of Related terms using Web Search Engines, by Keigo Watanabe, Danushka Bollegala, Yutaka Matsuo, and Mitsuru Ishizuka". Also, another relevancy calculation method is a technique in which the positions of terms in a word space are represented as distances. According to this method, the smaller the distance is between terms, the higher the relevancy between the terms is, and the larger the distance is between terms, the lower the relevancy between the terms is.

In the following description of the relevancy calculation unit 131, from the viewpoint of generic-specific concepts, a synonymous relationship, a quasi-synonymous relationship, and a co-occurrence relationship, the relevancy between terms will be described using the example of a dissimilarity F calculated as a value indicating the extent to which terms are different from each other. The dissimilarity F takes a smaller value the less dissimilar terms are, and takes a higher value the more dissimilar terms are. Accordingly, the smaller the dissimilarity F value is, the higher the relevancy between terms is, and the higher the dissimilarity F value is, the lower the relevancy between terms is. Note that a conventional method can be used to calculate the dissimilarity F, and therefore a specific calculation method will not be described, and only calculated values for the dissimilarity F will be described.

First, for each term in the sensor-side metadata items, the terms registered in the thesaurus 2 are searched to find related terms that are related to that term. For example, for each term in the sensor-side metadata items, the terms registered in the thesaurus 2 are searched to find first related terms, which are terms that are a more generic or specific concept of that term, are in a synonymous relationship or a quasi-synonymous relationship therewith, or have a high frequency of co-occurrence therewith, for example.

Next, the dissimilarity F is calculated for each related term for the sensor-side metadata term. In the following, it is assumed that there are related terms a, b, c, and g for a term X in the sensor-side metadata, and the dissimilarities of the related terms a, b, c, and g for the term X in the sensor-side metadata will be represented by "dissimilarity F (term X–related term)". The smaller the value of dissimilarity F (term X–related term) is, the higher the relevancy is, and the larger the value of dissimilarity F (term X–related term) is, the lower the relevancy is. Here, the dissimilarity F takes the following values for the related terms a, b, c, and g for the term X in the sensor-side metadata.

$$\text{dissimilarity } F(\text{term } X\text{–related term } a) = 0.80$$

$$\text{dissimilarity } F(\text{term } X\text{–related term } b) = 0.60$$

$$\text{dissimilarity } F(\text{term } X\text{–related term } c) = 1.20$$

$$\text{dissimilarity } F(\text{term } X\text{–related term } g) = 0.90$$

Using a similar method, for each term in the application-side metadata items, the terms registered in the thesaurus 2 are searched to find related terms that are related to that term. For example, for each term in the application-side metadata items, the terms registered in the thesaurus 2 are searched to find second related terms, which are terms that are a more generic or specific concept of that term, are in a synonymous relationship or a quasi-synonymous relationship therewith, or high have a high frequency of co-occurrence therewith, for example.

Next, the dissimilarity F is calculated for each related term for the application-side metadata term. In the following, it is assumed that there are related terms a, d, e, f, and g for a term Y in the application-side metadata, and the dissimilarities F of the related terms a, d, e, f, and g for the term Y in the application-side metadata will be represented by "F (term Y–related term)". Here, the dissimilarity F takes the following values for the related terms a, d, e, f, and g for the term Y in the application-side metadata.

$$\text{dissimilarity } F(\text{term } Y\text{–related term } a) = 0.60$$

$$\text{dissimilarity } F(\text{term } Y\text{–related term } d) = 0.80$$

$$\text{dissimilarity } F(\text{term } Y\text{–related term } e) = 0.60$$

$$\text{dissimilarity } F(\text{term } Y\text{–related term } f) = 1.20$$

$$\text{dissimilarity } F(\text{term } Y\text{–related term } g) = 1.10$$

Next, the sensor candidate extraction unit 132 will be described.

The sensor candidate extraction unit 132 performs matching between the sensor-side metadata and the application-side metadata based on the dissimilarities F that were calculated by the relevancy calculation unit 131. The sensor-side metadata and the application-side metadata that are used in matching are sensor-side metadata and application-side metadata in which an acquired related term that is related to a term in the sensor-side metadata and an acquired related term that is related to a term in the application-side metadata are in common with each other. Specifically, they are sensor-side metadata and application-side metadata that both include the same related term having a dissimilarity F value. Matching is performed using the related terms and the dissimilarities F in such sensor-side metadata and application-side metadata.

Next, the extraction of sensor candidates by the sensor candidate extraction unit 132 will be described. In the following description, it is assumed that the relevancy calculation unit 131 has calculated dissimilarities F as described above.

Here, all of the related terms for which the dissimilarity F was calculated may be used in matching, but this increases the number of related terms and increases the matching processing load, and furthermore, the use of related terms that have low relevancy leads to the possibility of performing matching that is not intended by the user. In view of this, related terms having a dissimilarity F that is lower than a predetermined threshold value are used in metadata matching. Specifically, a related term having a dissimilarity F that is lower than the predetermined threshold value is determined to have a low dissimilarity and a high relevancy, whereas a related term having a dissimilarity F that is greater than or equal to the predetermined threshold value is determined to have a high dissimilarity and a low relevancy, and related terms having a high relevancy are used in matching.

Figure 3:
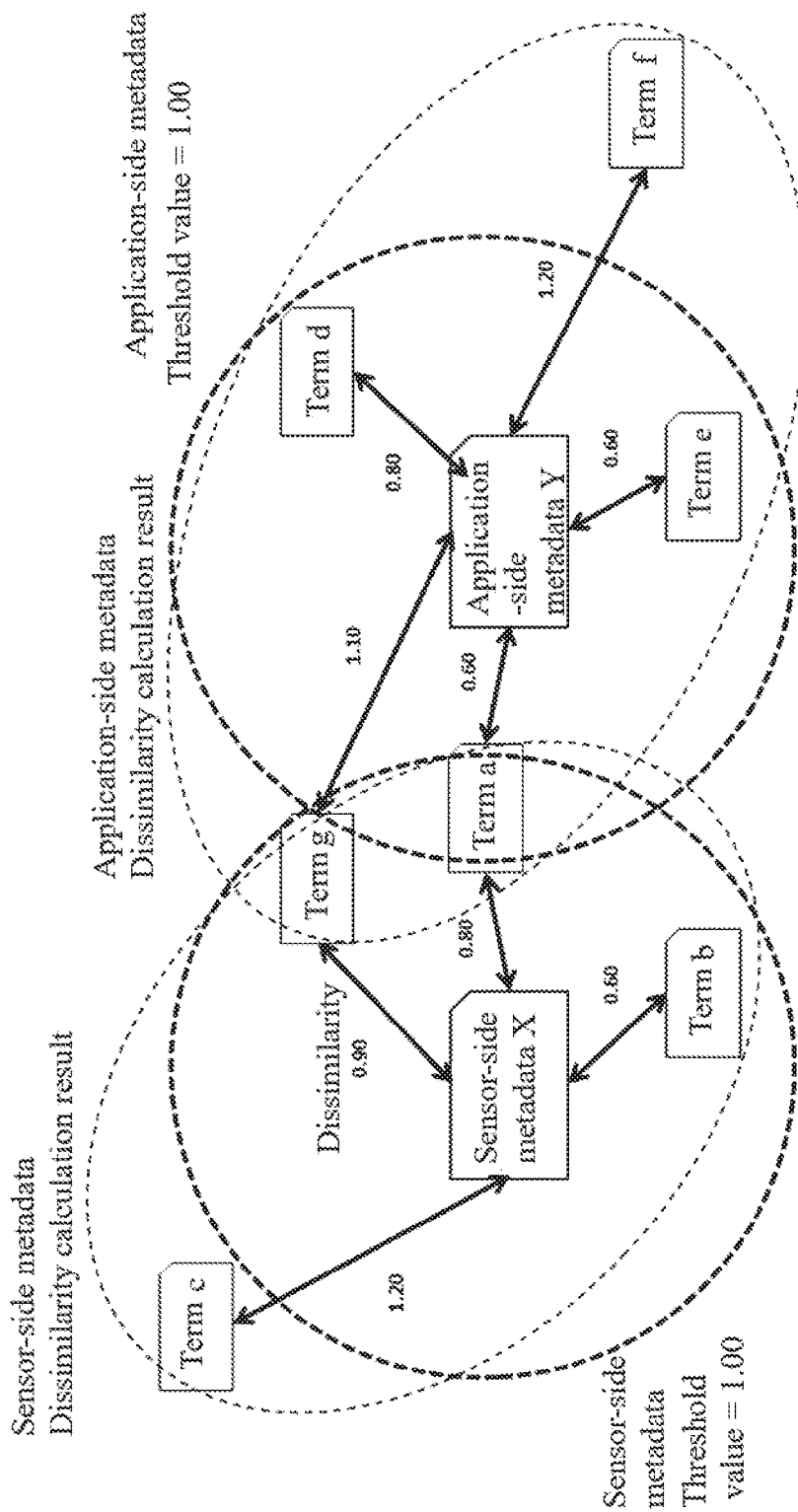
FIG. 3 is a diagram for illustrating operations of a relevancy calculation unit 131 and a sensor candidate extraction unit 132.

FIG. 3 shows an example of the case where the threshold value for determining which related terms are to be used is 1. Specifically, the related terms for which the dissimilarity F with the term X in the sensor-side metadata item is less than 1 (inside the dashed line circle) are the related term a, the related term b, and the related term g. Accordingly, the first related terms that will be used as related term for the term X in the sensor-side metadata are the related term a, the related term b, and the related term g. On the other hand, the related term c has a dissimilarity F that is greater than or equal to 1, and will not be used in matching.

Also, the related terms for which the dissimilarity F with the term Y in the application-side metadata item is less than 1 (inside the dashed line circle) are the related term a, the related term d, and the related term e. Accordingly, the related terms that will be used as second related terms for the term X in the application-side metadata are the related term a, the related term d, and the related term e. On the other hand, the related term g and the related term g have a dissimilarity F that is greater than or equal to 1, and will not be used in matching.

Note that although the threshold value for the dissimilarity F for use as a related term is the same for both the sensor-side metadata and the application-side metadata in the above example, different threshold values may be set.

Next, the sensor candidate extraction unit 132 determines that the sensor-side metadata and the application-side metadata match if the first related term for the term in the sensor-side metadata and the second related term for the term in the application-side metadata are in common with each other, and extracts the sensor corresponding to that sensor-side metadata as a sensor candidate.

In the example in FIG. 3, the first related terms for the term X in the sensor-side metadata are the related term a, the related term b, and the related term g. Also, the second related terms for the term Y in the application-side metadata item are the related term a, the related term d, and the related term e. The related term a is a common related term. Accordingly, it is determined that there is a match between the sensor-side metadata and the application-side metadata that have the related term a in common, and the sensor corresponding to the sensor-side metadata having the term X is extracted as a sensor candidate.

The processing of the sensor candidate extraction unit 132 described above is shown in FIG. 4.

In the example in FIG. 4, on the left side, the dissimilarity F values between the related terms and the term X in the sensor-side metadata item are arranged in descending order, and on the right side, the dissimilarity F values between the related terms and the term Y in the application-side metadata item are arranged in descending order. This also shows an example in which the related terms having a dissimilarity F less than the threshold value 1 are used in matching.

Specifically, the related terms for which the dissimilarity F with the term X in the sensor-side metadata item is less than 1 are the related term a, the related term b, and the related term g. Accordingly, the first related terms that will be used as related term for the term X in the sensor-side metadata are the related term a, the related term b, and the related term g. On the other hand, the related term c has a dissimilarity F that is greater than or equal to 1, and will not be used in matching.

Also, the related terms for the term Y in the application-side metadata item that have a dissimilarity F less than 1 are the related term a, the related term d, and the related term e. Accordingly, the related terms that will be used as second related terms for the term X in the application-side metadata are the related term a, the related term d, and the related term e. On the other hand, the related term f and the related term g have a dissimilarity F that is greater than or equal to 1, and will not be used in matching.

The related term a is a common related term. Accordingly, it is determined that there is a match between the sensor-side metadata and the application-side metadata that have the related term a in common, and the sensor corresponding to the sensor-side metadata having the term X is extracted as a sensor candidate.

A configuration is possible in which, at this time, the matching unit 13 presents the sensor extracted as a sensor candidate to the application-side user. FIG. 5 is a block diagram of the matching unit 13 in the case of including a function for presenting, to the application-side user, a candidate sensor that is capable of providing sensing data that satisfies the needs of the matching application.

As shown in FIG. 5, the matching unit 13 includes a sensor candidate presentation unit 133. The sensor candidate presentation unit 133 presents, to the application-side user, a sensor candidate obtained from the sensor candidate extraction unit 132 and the metadata of that sensor. The present method may be a method of displaying the sensor candidate and the metadata of that sensor on a display, a method of printing out a document describing that content, or sending the user an e-mail describing that content.

Next, a specific example of operations of the relevancy calculation unit 131, the sensor candidate extraction unit 132, and the sensor candidate presentation unit 133 will be described with reference to FIG. 6.

In the following description, the sensors include an "absolute pressure sensor", a "blood pressure meter", and a "load sensor", and the sensor-side metadata includes the term "absolute pressure sensor" in sensor-side metadata 1 for the "absolute pressure sensor", the term "blood pressure meter" in sensor-side metadata 2 for the "blood pressure meter", and the term "load sensor" in sensor-side metadata 3 for the "load sensor". Also, the term "pressure sensor" is included as application-side metadata.

First, the relevancy calculation unit 131 searches the thesaurus 2 for related terms that are related to the term "absolute pressure sensor" in the sensor-side metadata 1. Here, the related term "air pressure sensor" and the related term "temperature sensor" are found in the thesaurus 2 as related terms for the term "absolute pressure sensor" in the sensor-side metadata 1. The dissimilarity F is then calculated between the term "absolute pressure sensor" in the sensor-side metadata 1 and each of the related terms. The calculation results are as follows.

dissimilarity $F$(term "absolute pressure sensor"–related term "air pressure sensor")=0.20 dissimilarity $F$(term "absolute pressure sensor"–related term "temperature sensor")=0.40

Next, the relevancy calculation unit 131 searches the thesaurus 2 for related terms that are related to the term "blood pressure meter" in the sensor-side metadata 2. Here, the related term "pressure sensor", the related term "blood pressure monitor", and the related term "blood pressure sensor" are found in the thesaurus 2 as related terms for the term "blood pressure meter" in the sensor-side metadata 2. The dissimilarity F is then calculated between the term "blood pressure meter" in the sensor-side metadata 2 and each of the related terms. The calculation results are as follows.

dissimilarity $F$(term "blood pressure meter"–related term "pressure sensor")=0.50 dissimilarity $F$(term "blood pressure meter"–related term "blood pressure monitor")=0.10 dissimilarity $F$(term "blood pressure meter"–related term "blood pressure sensor")=0.10

Furthermore, the relevancy calculation unit 131 searches the thesaurus 2 for related terms that are related to the term "load sensor" in the sensor-side metadata 3. Here, the related term "strain gauge" and the related term "weight sensor" are found in the thesaurus 2 as related terms for the term "load sensor" in the sensor-side metadata 3. The dissimilarity F is then calculated between the term "load sensor" in the sensor-side metadata 3 and each of the related terms. The calculation results are as follows.

dissimilarity $F$(term "load sensor"–related term "strain gauge")=0.30 dissimilarity $F$(term "load sensor"–related term "weight sensor")=0.10

Furthermore, the relevancy calculation unit 131 searches the thesaurus 2 for related terms that are related to the term "pressure sensor" in the application-side metadata. Here, the related term "pressure meter", the related term "pressure gauge", the related term "pressure monitor", the related term "air pressure sensor", the related term "blood pressure meter", and the related term "strain gauge" are found in the thesaurus 2 as related terms for the term "pressure sensor" in the application-side metadata. The dissimilarity F is then calculated between the term "pressure sensor" in the application-side metadata and each of the related terms. The calculation results are as follows.

dissimilarity $F$(term "pressure sensor"–related term "pressure meter")=0.10 dissimilarity $F$(term "pressure sensor"–related term "pressure gauge")=0.10 dissimilarity $F$(term "pressure sensor"–related term "pressure monitor")=0.10 dissimilarity $F$(term "pressure sensor"–related term "air pressure sensor")=0.70 dissimilarity $F$(term "pressure sensor"–related term "blood pressure meter")=0.50 dissimilarity $F$(term "pressure sensor"–related term "strain gauge")=1.20

The sensor candidate extraction unit 132 then performs matching using, among the related terms, the related terms that are related to both the sensor-side metadata and the application-side metadata (the related terms that have a dissimilarity F value for both the sensor-side metadata and the application-side metadata) and the dissimilarity F values thereof. At this time, only related terms having a dissimilarity F less than 1 are used in matching.

Specifically, the related terms that have a dissimilarity F less than 1 for the term "absolute pressure sensor" in the sensor-side metadata 1 are the related term "air pressure sensor" and the related term "temperature sensor". Also, the related terms that have a dissimilarity F less than 1 for the term "blood pressure meter" in the sensor-side metadata 2 are the related term "pressure sensor", the related term "blood pressure monitor", and the related term "blood pressure sensor". Also, the related terms that have a dissimilarity F less than 1 for the term "load sensor" in the sensor-side metadata 3 are the related term "strain gauge" and the related term "weight sensor". Moreover, the related terms that have a dissimilarity F less than 1 for the term "pressure sensor" in the application-side metadata are the related term "pressure meter", the related term "pressure gauge", the related term "pressure monitor", the related term "air pressure sensor", and the related term "blood pressure meter".

Among these related terms, the common related terms for the sensor-side metadata and the application-side metadata are the related term "air pressure sensor" and the related term "blood pressure meter".

Accordingly, the sensor candidate extraction unit 132 extracts "blood pressure meter" and "absolute pressure sensor" as candidate sensors that can provide sensing data that satisfies the application-side needs.

At this time, a priority ranking may be applied to the extracted "blood pressure meter" and "absolute pressure sensor". One method of calculating the priority ranking is a method of using a sum value of the dissimilarity F between the common related term and the sensor-side metadata and the dissimilarity F between the common related term and the application-side metadata. This is because it is thought that the smaller the sum value of the dissimilarity F values is, the less dissimilarity there is between the terms. The sum values for "blood pressure meter" and "absolute pressure sensor" are as shown below.

"blood pressure meter"

(dissimilarity between sensor-side metadata 2 term "blood pressure meter" and related term "pressure sensor")+(dissimilarity between application-side metadata term "pressure sensor" and related term "blood pressure meter")

=dissimilarity $F$(term "blood pressure meter"–related term "pressure sensor")

=0.5

Note that in this example, the sensor-side metadata 2 term and the application-side metadata term are related terms with respect to each other, and therefore the sum value is obtained using the dissimilarity F values for the sensor-side metadata 2 term and the application-side metadata term.
"absolute pressure sensor"

(dissimilarity between sensor-side metadata 1 term "absolute pressure sensor" and related term "air pressure sensor")+(dissimilarity between application-side metadata term "pressure sensor" and related term "air pressure sensor")

=dissimilarity $F$(term "absolute pressure sensor"–related term "air pressure sensor")+dissimilarity $F$(term "pressure sensor"–related term "air pressure sensor")

=0.20+0.70

=0.90

Accordingly, the sensor candidate extraction unit 132 sets "blood pressure meter" as priority rank 1 and sets "absolute pressure sensor" as priority rank 2.

Figures 7, 8:
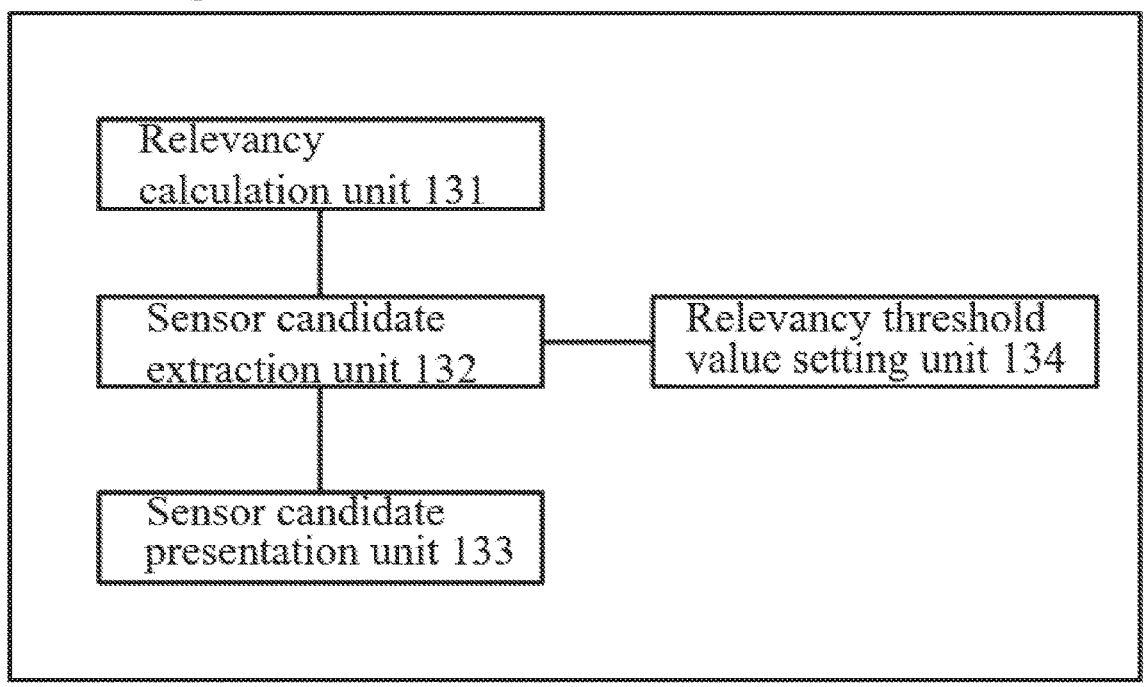
FIG. 7 is a diagram showing an example of presenting sensor candidates to an application-side user.
FIG. 8 is a block diagram of the matching unit 13 in a modified example of the first embodiment.

The sensor candidate presentation unit 133 then presents the sensor candidates to the application-side user. FIG. 7 shows an example of presenting sensor candidates to the application-side user. In FIG. 7, "Sensor A" corresponding to "blood pressure meter" in the sensor-side metadata and "Sensor B" corresponding to "absolute pressure sensor" in the sensor-side metadata, which were extracted by the sensor candidate extraction unit 132, are presented in a list along with the priority ranks and the dissimilarity F values thereof.

The dataflow control command instruction unit 14 receives the matching results obtained by the matching unit 13, and transmits a dataflow control command to the data distribution control apparatus 4. This dataflow control command is command information that includes information specifying the sensor data providing system 3 that is the data provision source and the application system 5 that is the data use destination, and that instructs the distribution of data from the data provision source to the data use destination.

Figure 6:
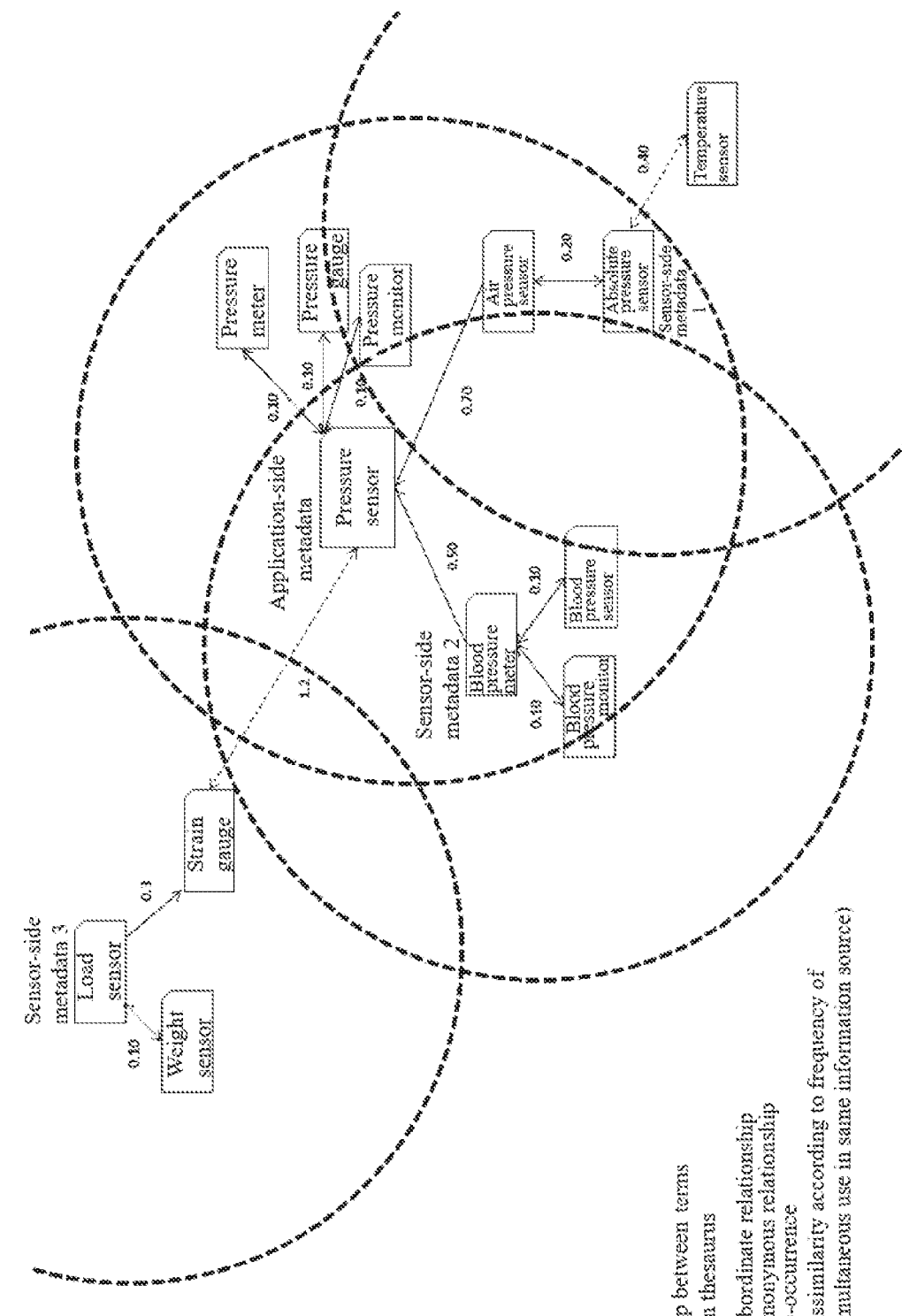
FIG. 6 is a diagram for illustrating operations of the relevancy calculation unit 131, the sensor candidate extraction unit 132, and a sensor candidate presentation unit 133 using a specific example in the first embodiment.

For example, in the above-described example in FIG. 6, in the case where the application system 5 side has designated the sensor "blood pressure meter" having the priority rank 1, the dataflow control command is command information that includes information for specifying the sensor data providing system 3, which is to provide sensing data from the sensor "blood pressure meter", and the application system 5, which is to use the sensing data from the sensor "blood pressure meter" and has "pressure sensor" registered as metadata, and is command information that instructs the distribution of sensing data obtained by the sensor "blood pressure meter" from the sensor data providing system 3 to the application system 5.

Note that the information for specifying the sensor data providing system 3 and the application system 5 that is to be the data use destination may be IP addresses or the like. Also, the dataflow control command can instruct the distribution of sensing data obtained by one sensor to a plurality of applications. It can also instruct the distribution of sensing data from a plurality of sensors to one application. It can furthermore instruct the distribution of sensing data from a plurality of sensors to a plurality of applications.

Note that the following cases are examples of triggers for the output of the dataflow control command by the dataflow control command instruction unit 14.

(1) Case where the matching unit 13 determines, based on a predetermined condition, that there is a match between sensor-side metadata and application-side metadata (2) Case where the sensor candidate presentation unit 133 of the matching unit 13 presents, to the application-side user, a matching result between sensor-side metadata and application-side metadata obtained, and the application-side user desires, based on the matching result, the provision of sensing data The above cases are merely examples, and there is no limitation to the above cases.

In the first embodiment described above, the matching data is extended to sensor-side metadata and application-side metadata that have a common related term, thus making it possible to increase the number of matching opportunities while also suppressing a reduction in matching precision. Accordingly, an appropriate number of matches is obtained while also ensuring precision, thus consequently making it possible to output an appropriate number of dataflow control commands, to suppress network communication traffic, and to also effectively utilize resources in the system overall.

Furthermore, related terms having a high relevancy (e.g., in the above example, related terms having a dissimilarity F that is less than a predetermined threshold value) are used in matching, thus raising the possibility of performing matching that reflects the intentions of the sensor-side or application-side user. Also, the number of referenced related terms decreases, thus making it possible to also reduce the processing burden required for matching.

Also, according to the first embodiment, matching is performed between application-side metadata and sensor-side metadata, and matching is performed between an application that needs sensing data and a sensor that can provide that data. A dataflow control command is then transmitted to an apparatus that manages the sensor. This therefore promotes the distribution of sensing data in consideration of various conditions and improves the service, and moreover is beneficial to both the data provider and user.

Note that the above first embodiment describes an example in which both the relevancy between a sensor-side metadata term and a related term and the relevancy between an application-side metadata term and a related term are calculated, but a configuration is possible in which only one relevancy is calculated. For example, in the above-described specific example in FIG. 6, it can also be said that the sensor-side metadata 2 term "blood pressure meter" and the application-side metadata term "pressure sensor" are related terms that are in common with each other, and in this case, it is possible to calculate the relevancy (e.g., the dissimilarity F) for only one.

Also, the above description is given using an example in which the dissimilarity F value decreases as the relevancy between two terms increases, but depending on the method for calculating the dissimilarity F, there are also cases where the dissimilarity F value increases as the relevancy between two terms increases. If this type of method for calculating the dissimilarity F is applied to the present invention, the threshold value used when selecting related terms for use in matching of course also changes, and it goes without saying that a related term having a dissimilarity F value that is greater than or equal to the threshold value or exceeds the threshold value will be selected instead of a related term having a dissimilarity F value that is less than the threshold value.

Furthermore, the dissimilarity F is one example for obtaining the relevancy between terms, and as long as the relevancy between terms can be obtained, there is no limitation to using the dissimilarity F, and other methods may be used as described above.

Next, an example of changing the range of relevancy when determining related terms for use in matching will be described as a modified example of the first embodiment.

First Modified Example of First Embodiment

In the example described above, the sensor candidate extraction unit 132 sets in advance a threshold value for the dissimilarity F for selecting related terms that are to be used. However, there are cases where a related term for use in matching cannot be extracted according to the set threshold value. In other words, there are cases where the range of relevancy of related terms to be used in matching is too narrow.

In view of this, as shown in FIG. 8, the matching unit 13 is provided with a relevancy threshold value setting unit 134 that changes the threshold value for the dissimilarity F for selecting related terms to be used in matching. In order to widen the range of relevancy of the related terms to be used in matching, the relevancy threshold value setting unit 134 raises the threshold value for the dissimilarity F that is set in the sensor candidate extraction unit 132 (e.g., changes the threshold value from 1 to 1.2).

FIG. 9 is a diagram showing how the related terms used in matching change when the relevancy threshold value setting unit 134 changes the threshold value.

In FIG. 9, on the left side, the dissimilarity F values between the related terms and the term X in the sensor-side metadata item are arranged in descending order, and on the right side, the dissimilarity F values between the related terms and the term Y in the application-side metadata item are arranged in descending order. This also shows an example in which the related terms having a dissimilarity F less than the threshold value 1 are used in matching.

In the example in FIG. 9, the related terms a, b, c, and g are related to the term X in the sensor-side metadata, and the related terms a, b, c, and g for the term X in the sensor-side metadata have the following dissimilarity F values.

dissimilarity $F$(term $X$–related term $a$)=1.10 dissimilarity $F$(term $X$–related term $b$)=0.60 dissimilarity $F$(term $X$–related term $c$)=1.30 dissimilarity $F$(term $X$–related term $g$)=0.60

Also, the related terms a, d, e, f, and g are related to the term Y in the application-side metadata, and the related terms a, d, e, f, and g for the term Y in the application-side metadata have the following dissimilarity F values.

dissimilarity $F$(term $Y$–related term $a$)=0.60 dissimilarity $F$(term $Y$–related term $d$)=0.80 dissimilarity $F$(term $Y$–related term $e$)=0.60 dissimilarity $F$(term $Y$–related term $f$)=1.25 dissimilarity $F$(term $Y$–related term $g$)=1.25

Accordingly, the related terms for which the dissimilarity F with the term X in the sensor-side metadata is less than 1 are the related term a, the related term b, and the related term g. Accordingly, the first related terms that will be used as related terms for the term X in the sensor-side metadata are the related term a, the related term b, and the related term g. On the other hand, the related term c has a dissimilarity F that is greater than or equal to 1, and will not be used in matching.

Also, the related terms for the term Y in the application-side metadata that have a dissimilarity F less than 1 are the related term a, the related term d, and the related term e. Accordingly, the related terms that will be used as second related terms for the term X in the application-side metadata are the related term a, the related term d, and the related term e. On the other hand, the related term g and the related term g have a dissimilarity F that is greater than or equal to 1, and will not be used in matching.

Accordingly, there is no related term that has a dissimilarity F less than 1 and is in common with both the term X in the sensor-side metadata item and the term Y in the application-side metadata item.

In view of this, the threshold value for the dissimilarity F is changed from 1 to 1.2. The case of changing the threshold value for the dissimilarity F from 1 to 1.2 is shown on the lower side in FIG. 9.

Due to changing the threshold value for the dissimilarity F from 1 to 1.2, the related term a that is related to the term X in the sensor-side metadata item and has a dissimilarity F of 1.10 is newly included as a related term that is to be used in matching.

As a result, the related term a is a related term that is in common between the sensor-side metadata and the application-side metadata. Accordingly, it is determined that there is a match between the sensor-side metadata and the application-side metadata that have the related term a in common, and the sensor corresponding to the sensor-side metadata having the term X is extracted as a sensor candidate.

Accordingly, a related term for use in matching is more likely to appear. Note that as a variation of the first modified example of the first embodiment, a configuration is also possible in which the application-side user can operate the relevancy threshold value setting unit 134, and the application-side user increases the threshold value for the dissimilarity F in order to widen the range of relevancy.

Note that although the dissimilarity F is used as an example of relevancy in the example described above, there is no limitation to this.

Second Modified Example of First Embodiment

There are cases where too many related terms for use in matching are selected according to the threshold value set in the relevancy calculation unit 131. In other words, there are cases where the range of relevancy of related terms to be used in matching is too wide. In view of this, in such a case, in order to set a more narrow range for the relevancy of the related term, the relevancy threshold value setting unit 134 reduces the threshold value for the dissimilarity F for determining the range of relevancy set in the sensor candidate extraction unit 132 (e.g., changes the threshold value from 1 to 0.5), thus obtaining an appropriate number of related terms.

Figure 10:
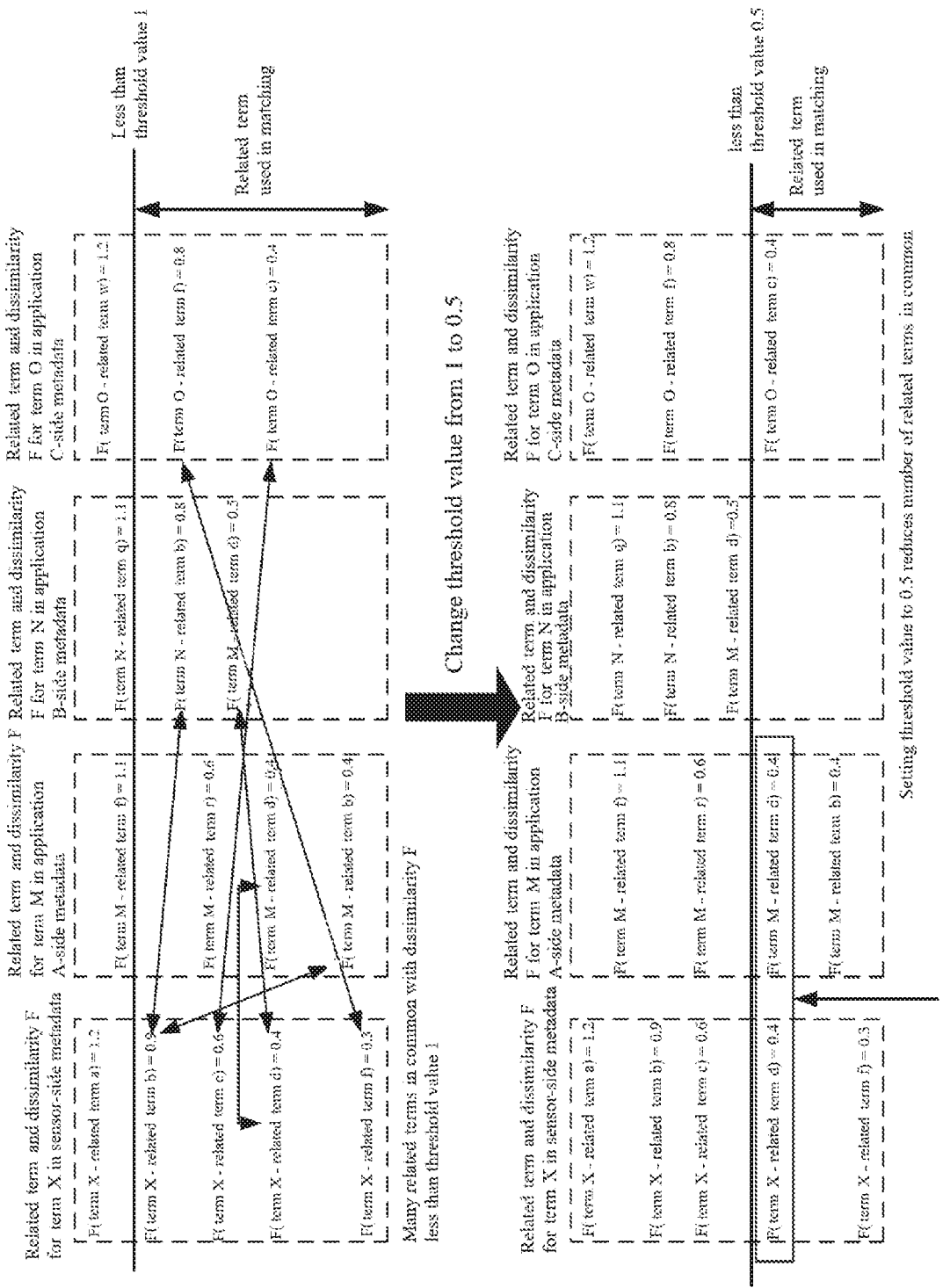
FIG. 10 is a diagram for illustrating a second modified example of the first embodiment.

FIG. 10 is a diagram showing how the related terms used in matching change when the relevancy threshold value setting unit 134 changes the threshold value.

In FIG. 10, the dissimilarity F values between the related terms and the term X in the sensor-side metadata item, and the dissimilarity F values with respect to the term M in application A-side metadata item, the term N in application B-side metadata item, and the term O in application C-side metadata item are arranged in descending order, from the left side toward the right side. This also shows an example in which the related terms having a dissimilarity F less than the threshold value 1 are used in matching.

In the example in FIG. 10, the related terms a, b, c, d, and f are related to the term X in the sensor-side metadata, and the related terms a, b, c, d, and f for the term X in the sensor-side metadata have the following dissimilarity F values.

$$\text{dissimilarity } F(\text{term } X\text{–related term } a) = 1.20$$

$$\text{dissimilarity } F(\text{term } X\text{–related term } b) = 0.90$$

$$\text{dissimilarity } F(\text{term } X\text{–related term } c) = 0.60$$

$$\text{dissimilarity } F(\text{term } X\text{–related term } d) = 0.40$$

$$\text{dissimilarity } F(\text{term } X\text{–related term } f) = 0.30$$

Also, the related terms b, d, f, and r are related to the term M in the application A-side metadata, and the related terms b, d, f, and r for the term M in the application A-side metadata have the following dissimilarity F values.

$$\text{dissimilarity } F(\text{term } M\text{–related term } b) = 0.40$$

$$\text{dissimilarity } F(\text{term } M\text{–related term } d) = 0.40$$

$$\text{dissimilarity } F(\text{term } M\text{–related term } f) = 1.10$$

$$\text{dissimilarity } F(\text{term } M\text{–related term } r) = 0.60$$

Also, the related terms b, d, and q are related to the term N in the application B-side metadata, and the related terms b, d, and q for the term N in the application B-side metadata have the following dissimilarity F values.

$$\text{dissimilarity } F(\text{term } N\text{–related term } b) = 0.80$$

$$\text{dissimilarity } F(\text{term } N\text{–related term } d) = 0.50$$

$$\text{dissimilarity } F(\text{term } N\text{–related term } q) = 1.10$$

Also, the related terms c, f, and w are related to the term O in the application C-side metadata, and the related terms b, d, and q for the term O in the application C-side metadata have the following dissimilarity F values.

$$\text{dissimilarity } F(\text{term } O\text{–related term } c) = 0.40$$

$$\text{dissimilarity } F(\text{term } O\text{–related term } f) = 0.80$$

$$\text{dissimilarity } F(\text{term } O\text{–related term } w) = 1.20$$

Accordingly, the related terms for which the dissimilarity F with the term X in the sensor-side metadata is less than 1 are the related term b, the related term c, the related term d, the related term f, and the related term r. Accordingly, the first related terms that will be used as related term for the term X in the sensor-side metadata are the related term b, the related term c, the related term d, the related term f, and the related term r. On the other hand, the related term a has a dissimilarity F that is greater than or equal to 1, and will not be used in matching.

Also, the related terms for which the dissimilarity F with the term M in the application A-side metadata is less than 1 are the related term b, the related term d, and the related term r. Accordingly, the related terms that will be used as second related terms for the term M in the application A-side metadata are the related term b, the related term d, and the related term r. On the other hand, the related term f has a dissimilarity F that is greater than or equal to 1, and will not be used in matching.

Also, the related terms for which the dissimilarity F with the term N in the application B-side metadata is less than 1 are the related term b and the related term d. Accordingly, the related terms that will be used as second related terms for the term N in the application B-side metadata are the related term b and the related term d. On the other hand, the related term g has a dissimilarity F that is greater than or equal to 1, and will not be used in matching.

Also, the related terms for the term O in the application C-side metadata that have a dissimilarity F less than 1 are the related term c and the related term f. Accordingly, the related terms that will be used as second related terms for the term O in the application C-side metadata are the related term c and the related term f. On the other hand, the related term w has a dissimilarity F that is greater than or equal to 1, and will not be used in matching.

Here, the related terms that are in common between the sensor-side metadata and the application-side metadata are as follows.

related term b in common between sensor-side metadata and application B-side metadata related term b in common between sensor-side metadata and application A-side metadata related term c in common between sensor-side metadata and application C-side metadata related term d in common between sensor-side metadata and application A-side metadata related term d in common between sensor-side metadata and application B-side metadata related term f in common between sensor-side metadata and application C-side metadata In this way, the matching sensor-side metadata is matched with all of the application-side metadata. This is because the range of relevancy of related terms to be used in matching is too wide, and there are too many related terms.

In view of this, the threshold value for the dissimilarity F is changed from 1 to 0.5. The case of changing the threshold value for the dissimilarity F from 1 to 0.5 is shown on the lower side in FIG. 10.

Due to changing the threshold value for the dissimilarity F from 1 to 0.5, the related terms to be used in matching are reduced to the related term b, the related term d, and the related term f. As a result, only the related term d is a related term that is in common between the sensor-side metadata and the application-side metadata.

Accordingly, it is determined that there is a match between the sensor-side metadata and the application A-side metadata that have the related term d in common, and the sensor corresponding to the sensor-side metadata having the term M is extracted as a sensor candidate.

In this way, by changing the threshold value, it is possible to set a narrower range for the relevancy of related terms, reduce the number of related terms that are to be used in matching, and raise the matching precision.

Note that as a variation of the second modified example of the first embodiment, a configuration is also possible in which the application-side user can operate the relevancy threshold value setting unit 134, the application-side user reduces the threshold value for the dissimilarity F in order to set a narrower range of relevancy.

Also, although the dissimilarity F is used as an example of relevancy in the example described above, there is no limitation to this.

Third Modified Example of First Embodiment

The width of the range of relevancy of related terms is set by the relevancy threshold value setting unit 134 in order for metadata intended by the user to be used in matching. Accordingly, as one method for setting the threshold value that determines the range of relevancy of related terms that are to be used, there is a method in which the relevancy threshold value setting unit 134 stores a threshold value that is set at the time when a contract is established for providing sensor data to an application through matching between sensor-side metadata and application-side metadata, and when matching processing is to be started the next time, the stored threshold value is set as the initial threshold value for the dissimilarity F for selecting related terms that are to be used. This is because when a match is made between sensor-side metadata and application-side metadata, it is thought that the relevancy range of relevancy is appropriate at that time. In other words, it is thought that the threshold value for the dissimilarity F for determining the range of relevancy is appropriate.

The following cases are examples regarding times when a contract is established for providing sensor data to an application.

- When a contract for providing sensor sensing data to an application is established by a sensor-side user and an application-side user after matching
- When a matching result is received, and then a dataflow control command is transmitted
- When a data distribution apparatus (Distributor) having a sensing data distributing function receives a dataflow control command, and sensing data is distributed from a sensor to an application
- When a data-using application receives sensing data
- When a data-using application has received sensing data, and then it has been checked whether or not the received sensing data can be used by the application At any of the above times, the apparatuses transmit a contact establishment signal to the relevancy threshold value setting unit 134, and the relevancy threshold value setting unit 134 sets the threshold value for the dissimilarity F of related terms used in matching when the contract was established as the initial value of the threshold value for the dissimilarity F of related terms that are to be used when matching processing is started the next time.

Other Modified Examples of First Embodiment

Next, other modified examples of the first embodiment will be described.

Figure 11:
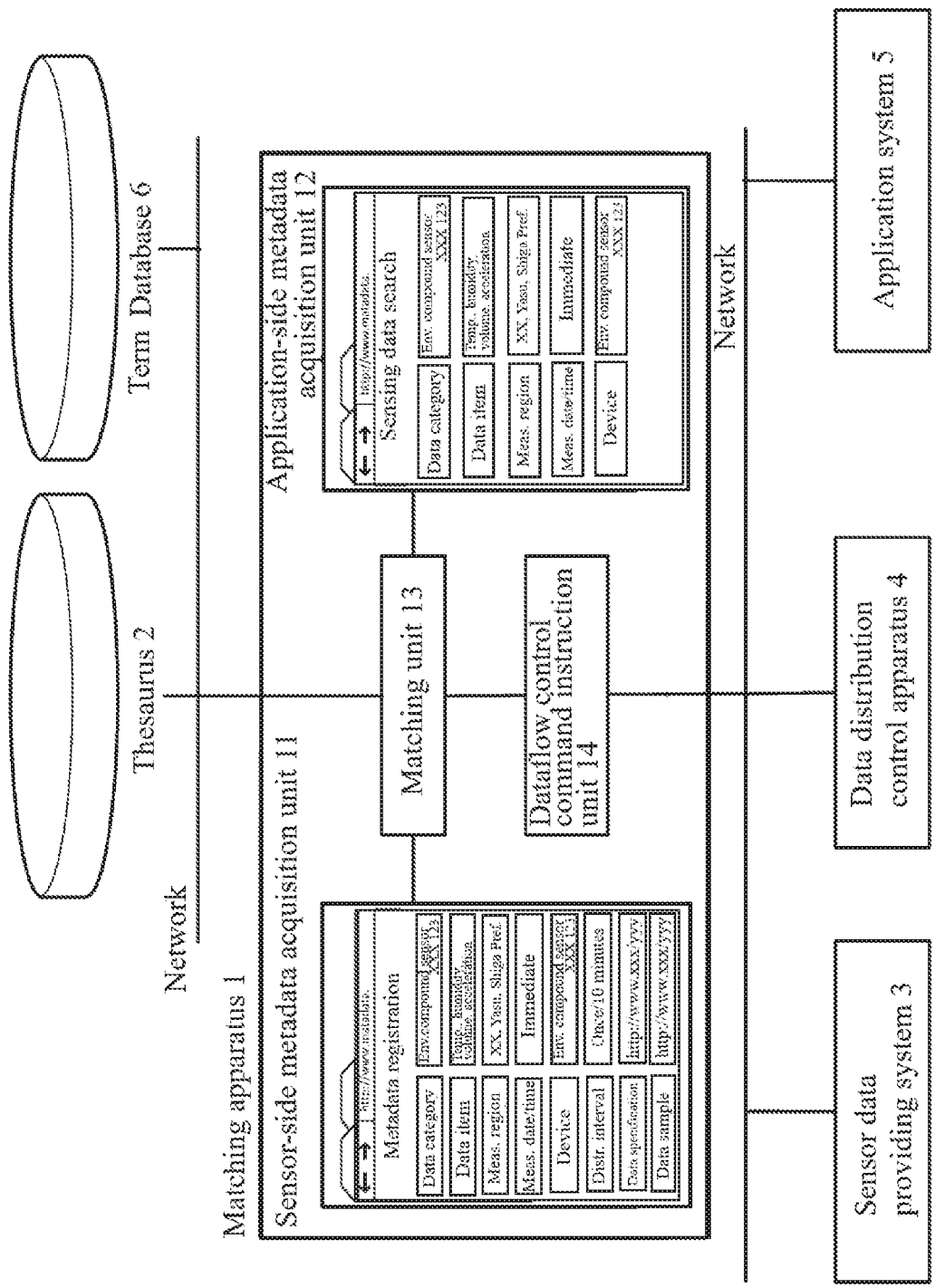
FIG. 11 is a block diagram of another modified example of the first embodiment.

FIG. 11 is a block diagram of another modified example of the first embodiment.

If it is possible to create a database of relevancies between terms and related terms calculated by the relevancy calculation unit 131, this has an advantage of reducing the number of terms for which relevancy is calculated when matching is performed at a later time.

In view of this, in another modified example of the first embodiment, a term database 6 of relevancies between terms and related terms calculated by the term relevancy calculation unit 131 is provided. The present embodiment describes an example in which the term database 6 is provided separately from the matching apparatus 1, and the matching apparatus 1 and the term database 6 are connected via a network, but the matching apparatus 1 may include the term database 6.

Figures 12, 13:
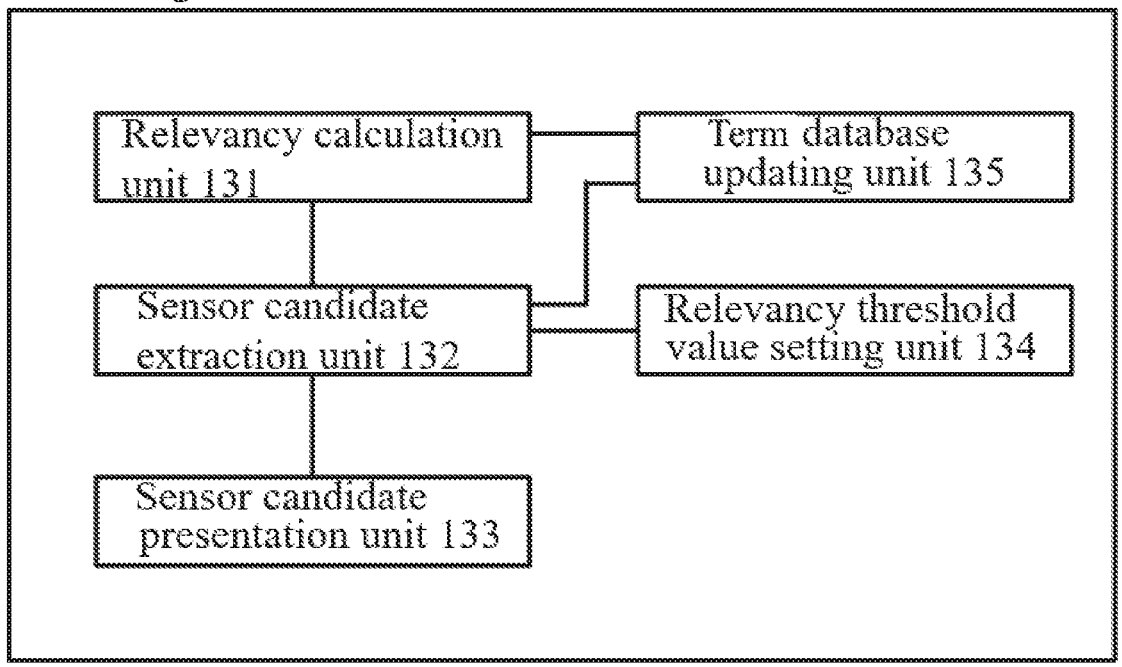
FIG. 12 is a block diagram of the matching unit 13.
FIG. 13 is a diagram showing an example of a term database 6 registered by a term database updating unit 135.

Also, as shown in FIG. 12, the matching unit 13 includes a term database updating unit 135. The term database updating unit 135 has a function by which terms found by the relevancy calculation unit 131 and the related terms thereof are registered (updated) in the term database 6 along with a corresponding dissimilarity F calculated by the relevancy calculation unit 131 as one example of relevancy. FIG. 13 is a diagram showing an example of the term database 6. FIG. 13 shows an example in which related terms for terms are stored in association with corresponding dissimilarity F values.

According to this configuration, by creating a database of found related terms and calculated relevancy values, it is possible to reduce the amount of processing performed in later matching.

Second Embodiment

A second embodiment describes an example in which the relevancy between sensor-side or application-side metadata and a related term is adjusted according to various situations. Note that configurations other than those for adjusting relevancy and extracting sensor candidates are similar to those in the first embodiment, and therefore only differing configurations will be described in detail.

For example, it is often the case that terms that are added to metadata in parallel are input by the user while recognizing that such terms are related to each other. For example, in the case of a desire for sensing data related to air pressure in order to obtain weather information, there is a high possibility that the user will add "air pressure sensor, weather" to application-side metadata. Similarly, it is often thought to be the case that a user on the sensing data providing side adds terms that are related to each other to metadata.

In view of this, the second embodiment describes an example in which attention is given to co-occurring terms between sensor-side metadata items and application-side metadata items when the relevancy calculation unit 131 calculates a relevancy. Note that in the second embodiment described below, similarly to the first embodiment, the dissimilarity F is used as an example of the relevancy calculated by the relevancy calculation unit 131.

The calculation of the dissimilarity F by the relevancy calculation unit 131 will be described with reference to FIG. 14.

Figure 14:
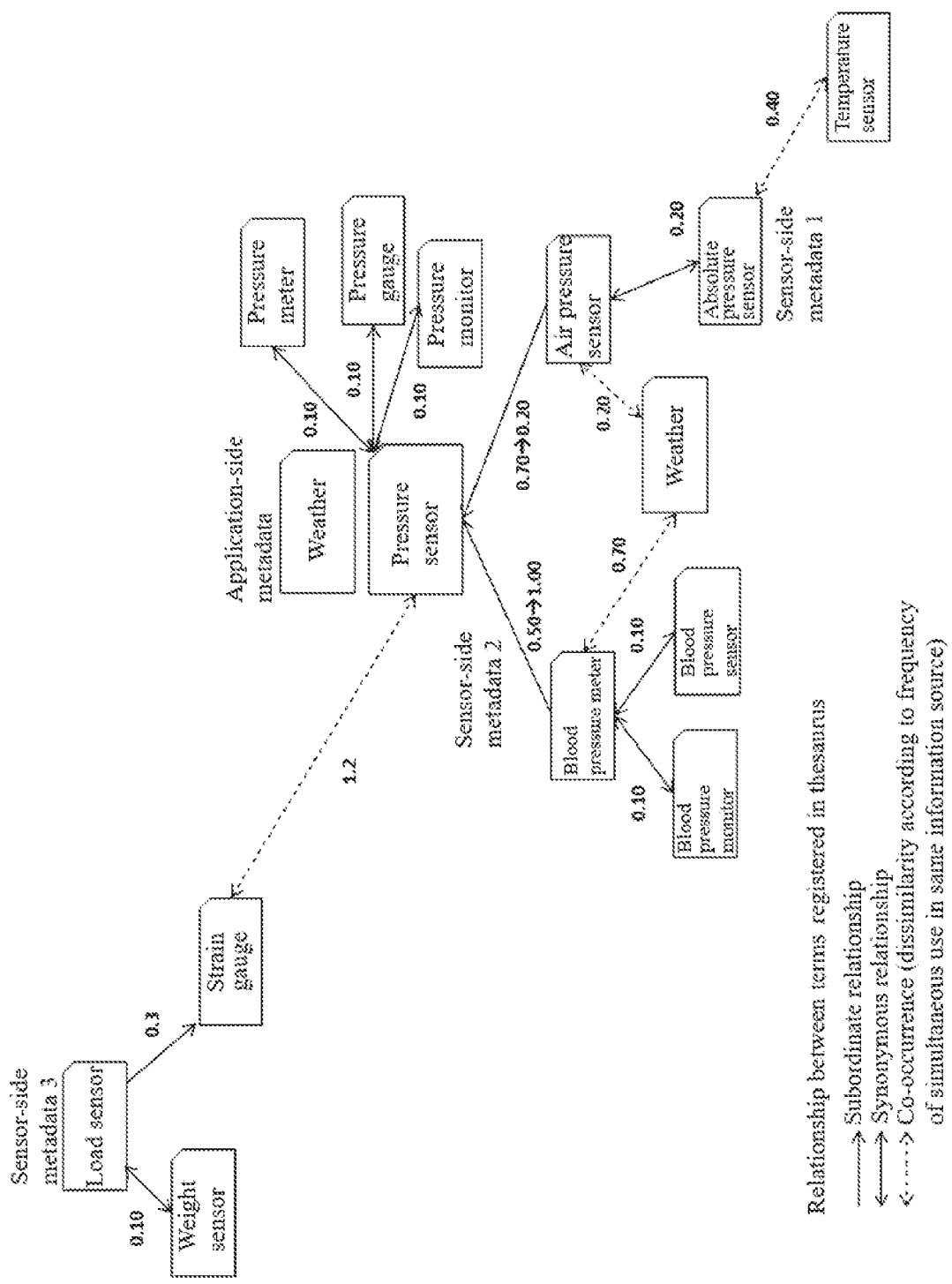
FIG. 14 is a diagram for illustrating operations of the relevancy calculation unit 131, the sensor candidate extraction unit 132, and the sensor candidate presentation unit 133 using a specific example in a second embodiment.

FIG. 14 shows an example of the case where "weather" and "pressure sensor" are input (registered) at the same time as application-side metadata, that is to say "weather" and "pressure sensor" co-occur as terms in the application-side metadata.

First, similarly to the first embodiment, the relevancy calculation unit 131 calculates the dissimilarity F between terms and related terms. This is shown specifically below.

Dissimilarity F between sensor-side metadata 1 term "absolute pressure sensor" and related terms dissimilarity $F$(term "absolute pressure sensor"–related term "air pressure sensor")=0.20 dissimilarity $F$(term "absolute pressure sensor"–related term "temperature sensor")=0.40

Dissimilarity F between sensor-side metadata 2 term "blood pressure meter" and related terms dissimilarity $F$(term "blood pressure meter"–related term "pressure sensor")=0.50 dissimilarity $F$(term "blood pressure meter"–related term "blood pressure monitor")=0.10 dissimilarity $F$(term "blood pressure meter"–related term "blood pressure sensor")=0.10

Dissimilarity F between sensor-side metadata 3 term "load sensor" and related terms dissimilarity $F$(term "load sensor"–related term "strain gauge")=0.30 dissimilarity $F$(term "load sensor"–related term "weight sensor")=0.10

Dissimilarity F between application-side metadata term "pressure sensor" and related terms dissimilarity $F$(term "pressure sensor"–related term "pressure meter")=0.10 dissimilarity $F$(term "pressure sensor"–related term "pressure gauge")=0.10 dissimilarity $F$(term "pressure sensor"–related term "pressure monitor")=0.10 dissimilarity $F$(term "pressure sensor"–related term "air pressure sensor")=0.70 dissimilarity $F$(term "pressure sensor"–related term "blood pressure meter")=0.50 dissimilarity $F$(term "pressure sensor"–related term "strain gauge")=1.20

Next, the relevancy calculation unit 131 calculates, as application-side metadata, a co-occurrence C between the term "weather" that co-occurs with "pressure sensor" and related terms. Note that this co-occurrence can also be said to be an indicator of relevancy.

Here, it is assumed that the term "blood pressure meter" and the term "air pressure sensor" exist as terms that co-occur with the term "weather", the co-occurrence C is calculated for the term "blood pressure meter" and the term "weather", and the co-occurrence C is calculated for the term "air pressure sensor" and the term "weather". The calculation results are as follows.

co-occurrence $C$(term "blood pressure meter"–term "weather")=0.70 co-occurrence $C$(term "air pressure sensor"–term "weather")=0.20

Based on these results, it can be seen that there is a high possibility that the term "weather" and the term "air pressure sensor" are used together. In view of this, the difference between these co-occurrence C values (0.70−0.20=0.50) is reflected in the dissimilarity F between the term "pressure sensor" and the term "blood pressure meter" and the dissimilarity F between the term "pressure sensor" and the term "air pressure sensor". Specifically, the relevancy between the term "pressure sensor" and the term "blood pressure meter" is lowered (the value of the dissimilarity F is increased), and the relevancy between the term "pressure sensor" and the term "air pressure sensor" is increased (the value of the dissimilarity F is lowered). The results of calculating corrected dissimilarity F' values is shown below.

dissimilarity $F'((F$(term "blood pressure meter"–related term "pressure sensor")+co-occurrence $C$ difference

=0.50+0.50=1.00 dissimilarity $F'((F$(term "pressure sensor"–related term "air pressure sensor")+co-occurrence $C$ difference

=0.70−0.50=0.20

These results show that there is a high possibility that the term "pressure sensor" input as application-side metadata is a "pressure sensor" that is related to "weather", and the related term "air pressure sensor" related to weather has a higher possibility of being related to the term "pressure sensor" input as application-side metadata than the related term "blood pressure meter" does.

The sensor candidate extraction unit 132 then performs matching using, among the related terms, the related terms that are related to both the sensor-side metadata and the application-side metadata (the related terms that have a dissimilarity F value or dissimilarity F' value for both the sensor-side metadata and the application-side metadata) and the dissimilarity F values or dissimilarity F' values thereof.

Here, similarly to the first embodiment, in the case where the threshold value for determining the related terms that are to be used is set to 1, only the related term "air pressure sensor" is a related term that is related to both the sensor-side metadata and the application-side metadata and has a dissimilarity F or a dissimilarity F' less than 1.

Accordingly, the sensor candidate extraction unit 132 extracts "absolute pressure sensor", which is the sensor corresponding to the sensor-side metadata 1 that is related to the related term "air pressure sensor", as a candidate sensor that can provide sensing data that satisfies the application-side needs.

Note that the following shows the sum value of the dissimilarity F or the dissimilarity F' between the common related term and the sensor-side metadata and the dissimilarity F or the dissimilarity F' between the common related term and the application-side metadata.

"absolute pressure sensor"

(dissimilarity $F'$ between sensor-side metadata 1 term "absolute pressure sensor" and related term "air pressure sensor")+(dissimilarity $F$ between application-side metadata term "pressure sensor" and related term "air pressure sensor")

dissimilarity $F'$(dissimilarity $F$(term "pressure sensor"–related term "air pressure sensor")−co-occurrence $C$ difference)+dissimilarity $F$(term "absolute pressure sensor"–related term "air pressure sensor")

=0.20+0.20

=0.40

The sensor candidate presentation unit 133 then presents the sensor candidates to the application-side user. FIG. 15 shows an example of presenting sensor candidates to the application-side user. In FIG. 15, "Sensor B" corresponding to "absolute pressure sensor" in the sensor-side metadata extracted by the sensor candidate extraction unit 132 is presented in a list along with the priority rank and the dissimilarity thereof.

In comparison with the example shown in FIG. 7 in the first embodiment, only "Sensor B" corresponding to "absolute pressure sensor" is presented to the user, and the dissimilarity value is smaller (the relevancy is higher), and it can be understood that high-precision matching has been performed.

In this way, rather than merely giving attention to only the terms in respective pieces of metadata, attention is given to the relationship between (co-occurrence of) metadata terms registered by the user, thus realizing higher precision matching that matches the application-side user's desire.

Note that similarly to the other modified example of the first embodiment, calculated relevancy values (e.g., the dissimilarity F or the dissimilarity F') may be registered in the term database 6 by the term database updating unit 135. In this case, co-occurring terms that co-occur with related terms are registered along with related term dissimilarity F' values that have been corrected (adjusted) according to the relationship with the co-occurring term.

FIG. 16 is a diagram showing an example of the term database 6 registered or updated by the term database updating unit 135. In the example in FIG. 16, each term is stored in association with a related term that is related thereto, the dissimilarity between them, and a co-occurring term that co-occurs with the related term. Note that the related terms for each term also include a related term dissimilarity F' that has been corrected (adjusted) based on the relationship with the co-occurring term.

Furthermore, examples of correcting (adjusting) the above-described relevancy between sensor-side or application-side metadata and a related term are not limited to the example of considering the frequency of co-occurrence of a term.

For example, a sensor-side or application-side metadata term and related term that were used when a contract was established in matching processing can be said to have high relevancy with each other. In view of this, the term database updating unit 135 obtains, from the sensor candidate extraction unit 132, the number of times that a contract was established in matching processing and the associated sensor-side or application-side metadata terms and related terms, and registers the obtained information in the term database 6.

FIG. 17 is a diagram showing an example of the term database 6 registered or updated by the term database updating unit 135 in this case.

When calculating relevancy, the relevancy calculation unit 131 references the number of times a contract was established in the term database 6, and performs correction for raising the relevancy between terms (e.g., reducing the dissimilarity F value) the higher the number of contracts were established is. For example, in the example in FIG. 17, a contract was established one time using the terms "pressure sensor" and "air pressure sensor", and therefore compared with the dissimilarity F in the case of not giving consideration to the number of times a contract was established as shown in FIG. 16, the dissimilarity F is corrected (adjusted) from 0.20 to 0.10, thus raising the relevancy. Note that the frequency of contract establishment can also be said to be an indicator of relevancy in the present invention.

Note that as described above, the following are cases where a contract is established.

When a contract for providing sensor sensing data to an application is established by a sensor-side user and an application-side user after matching When a matching result is received, and then a dataflow control command is transmitted When a data distribution apparatus (Distributor) having a sensing data distributing function receives a dataflow control command, and sensing data is distributed from a sensor to an application When a data-using application receives sensing data When a data-using application has received sensing data, and then it has been checked whether or not the received sensing data can be used by the application By calculating relevancy with consideration given to the number of times a contract is established in this way, it is possible to realize higher precision matching that matches the application-side user's desire.

Third Embodiment

The first embodiment describes an example in which a related term having a relevancy that is less than a predetermined threshold value is set as a related term that is to be used in matching. A third embodiment describes an example in which, unlike the first embodiment, in the case where there is a related term that is in common between the sensor-side metadata and the application-side metadata, matching is performed using a sum value of the relevancy between the common related term and the sensor-side metadata and the relevancy between the common related term and the application-side metadata. Note that configurations other than that for extracting sensor candidates are similar to those in the first embodiment, and therefore only differing configurations will be described in detail.

Figure 18:
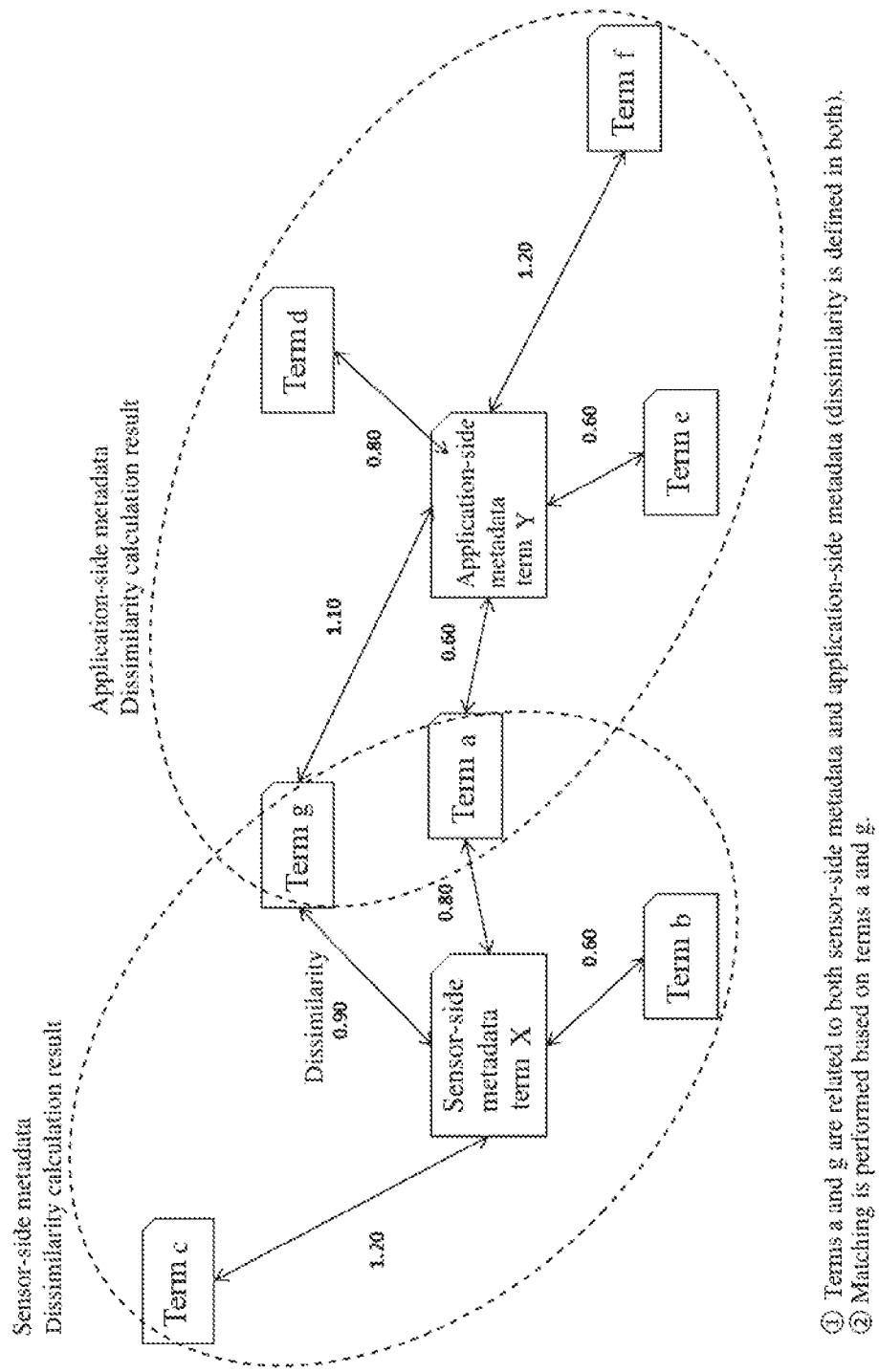
FIG. 18 is a diagram for illustrating operations of the relevancy calculation unit 131 and the sensor candidate extraction unit 132 in a third embodiment.

First, the relevancy between metadata terms and related terms calculated by the relevancy calculation unit 131 will be described in detail with reference to FIG. 18.

In the following example, it is assumed that the related term a, the related term b, the related term c, and the related term g are found in the thesaurus 2 as related terms that are related to a term X in a sensor-side metadata item.

The relevancy calculation unit 131 calculates the dissimilarity F between the term X and the related terms that are related to the term X. The dissimilarity F values between the term X and the respective related terms are as shown below.

dissimilarity $F$(term $X$–related term $a$)=0.80 dissimilarity $F$(term $X$–related term $b$)=0.60 dissimilarity $F$(term $X$–related term $c$)=1.20 dissimilarity $F$(term $X$–related term $g$)=0.90

Similarly, the relevancy calculation unit 131 searches the thesaurus 2 for related terms that are related to the term Y in an application-side metadata item. Here, it is assumed that the related term a, the related term d, the related term e, the related term f, and the related term g are found in the thesaurus 2 as related terms that are related to the term Y in an application-side metadata item.

The relevancy calculation unit 131 calculates the dissimilarity F between the term Y and the related terms that are related to the term Y. The dissimilarity F values between the term Y and the respective related terms are as shown below.

dissimilarity $F$(term $Y$–related term $a$)=0.60 dissimilarity $F$(term $Y$–related term $d$)=0.80 dissimilarity $F$(term $Y$–related term $e$)=0.60 dissimilarity $F$(term $Y$–related term $f$)=1.20 dissimilarity $F$(term $Y$–related term $g$)=1.10

Next, the sensor candidate extraction unit 132 will be described.

The sensor candidate extraction unit 132 performs matching between the sensor-side metadata and the application-side metadata based on the found terms and the calculated relevancies obtained by the relevancy calculation unit 131. The sensor-side metadata and the application-side metadata that are used in matching are sensor-side metadata and application-side metadata in which an acquired related term that is related to a term in the sensor-side metadata and an acquired related term that is related to a term in the application-side metadata are in common with each other. Specifically, they are sensor-side metadata and application-side metadata that both include the same related term with a dissimilarity F value. Matching is performed using the related terms and the dissimilarities F in such sensor-side metadata and application-side metadata.

Next, the extraction of sensor candidates by the sensor candidate extraction unit 132 will be described in detail with reference to FIG. 18. In the following description, it is assumed that the term relevancy calculation unit 131 has calculated dissimilarities F as described above.

In the example described above, the related term a and the related term g are related terms that are in both the sensor-side metadata and the application-side metadata and have a dissimilarity F, that is to say, are related terms that are in common between the sensor-side metadata and the application-side metadata, and the sensor candidate extraction unit 132 performs matching between the sensor-side metadata and the application-side metadata using the related term a and the related term g and the dissimilarity F values for them.

Specifically, in the case where a related term is in common between the sensor-side metadata and the application-side metadata, a sum value is obtained using the dissimilarity F between the common related term and the sensor-side metadata and the dissimilarity F between the common related term and the application-side metadata.

The following is the sum value for the dissimilarity F that the related term a has with the sensor-side metadata term X and the application-side metadata term Y.

dissimilarity $F$(term $X$–related term $a$)+dissimilarity $F$(term $Y$–related term $a$)

=0.80+0.60

=1.40

The following is the distance between the related term g and the sensor-side metadata term X and application-side metadata term Y.

dissimilarity $F$(term $X$–related term $g$)+dissimilarity $F$(term $Y$–related term $g$)

=0.90+1.10

=2.00

Here, as an example of a match determination method, there is a method in which, in the case where there are a plurality of related terms that are in common between the sensor-side metadata and the application-side metadata, it is determined that there is a match between the sensor-side metadata and the application-side metadata if the sum value of the dissimilarity F that each of the related terms has with the sensor-side metadata and the application-side metadata is less than or equal to a predetermined threshold value.

For example, in the above example, letting the predetermined threshold value be 4, the sum value of the dissimilarity F that the related term a has with the sensor-side metadata term X and the application-side metadata term Y is 1.40, the sum value of the dissimilarity F that the related term g has with the sensor-side metadata term X and the application-side metadata term Y is 2.00, and the sum value thereof is 3.40 (=1.40+2.00). Accordingly, the sum value of all of the dissimilarity F values is less than or equal to the predetermined threshold value 4, and therefore it is determined that there is a match between the sensor-side metadata and the application-side metadata.

As another example of a match determination method, there is a method in which, in the case where there are a plurality of related terms that are in common between the sensor-side metadata and the application-side metadata, the smallest dissimilarity F (highest relevancy) with the sensor-side metadata and the application-side metadata among all of the related terms is selected, and it is determined that there is a match between the sensor-side metadata and the application-side metadata if the selected dissimilarity F is less than or equal to the predetermined threshold value. The sensor corresponding to that sensor-side metadata is then extracted as a candidate sensor that can provide sensing data that satisfies the application's needs.

For example, in the above example, the value of the dissimilarity F that the related term a has with the sensor-side metadata term X and the application-side metadata term Y is 1.40, the value of the dissimilarity F that the related term g has with the sensor-side metadata term X and the application-side metadata term Y is 2.00, and therefore the sensor-side metadata and application-side metadata having the related term a in common are selected. Here, in the case where the predetermined threshold value is 1.50, if the dissimilarity F is less than or equal to 1.50, it is determined that there is a match between the sensor-side metadata and the application-side metadata. In this case, in the above example, the value of the dissimilarity F that the related term a has with the sensor-side metadata and the application-side metadata is 1.40, and therefore it is determined that there is a match between the sensor-side metadata and the application-side metadata that have the related term a in common. The sensor corresponding to that sensor-side metadata is then extracted as a candidate sensor that can provide sensing data that satisfies the application's needs.

Note that the match determination method is not limited to the method described above. For example, there is a method in which the relevancy that a related term has with sensor-side metadata and application-side metadata can be calculated without providing a threshold value as described above, that is to say, a configuration is possible in which all sensor-side metadata and application-side metadata that have a related term in common are set as matching candidates, and the sensors corresponding to such sensor-side metadata are extracted as candidates sensors that can provide sensing data that satisfies an application's needs.

Figure 19:
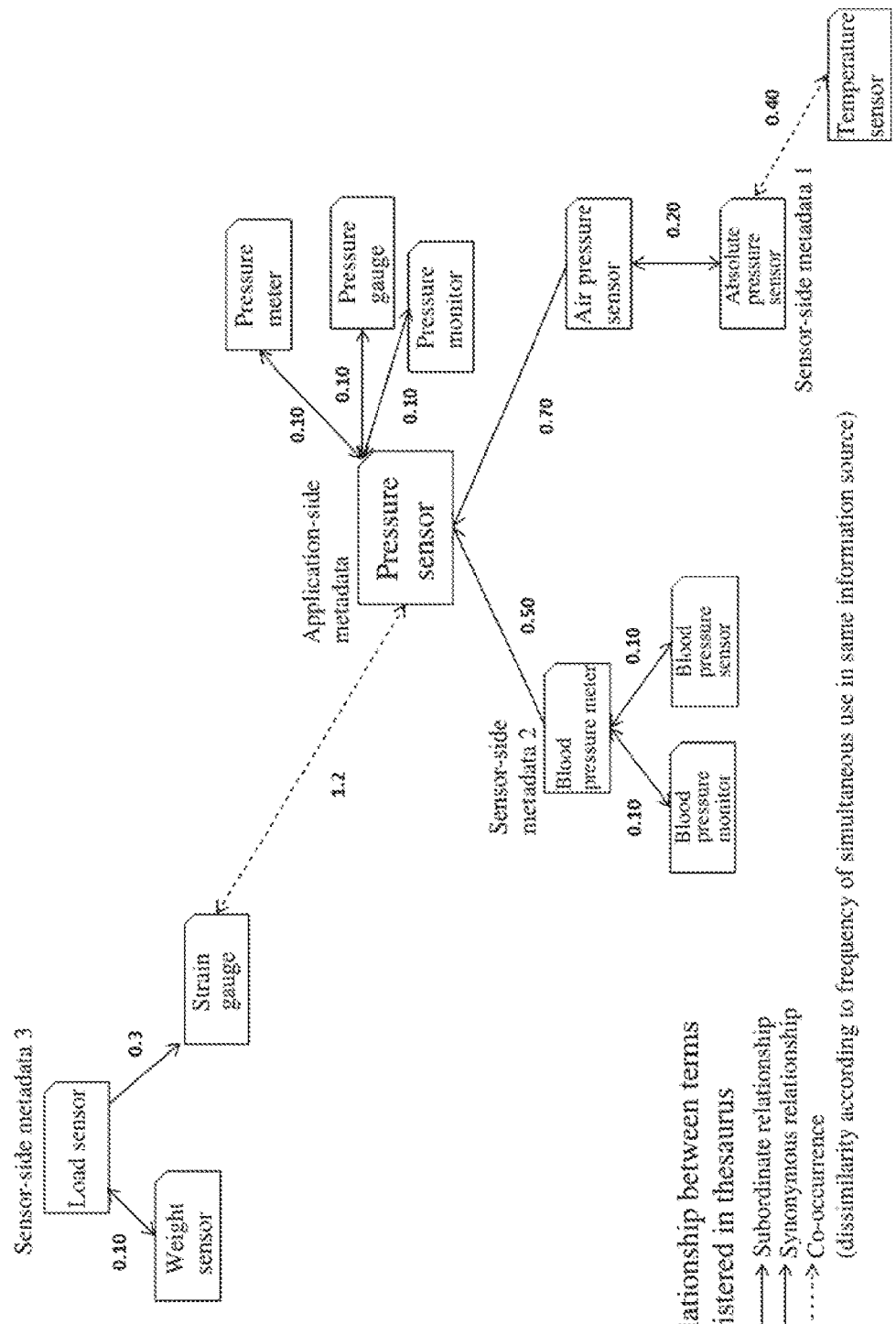
FIG. 19 is a diagram for illustrating operations of the relevancy calculation unit 131, the sensor candidate extraction unit 132, and the sensor candidate presentation unit 133 using a specific example in the third embodiment.

Next, a specific example of operations of the relevancy calculation unit 131, the sensor candidate extraction unit 132, and the sensor candidate presentation unit 133 will be described with reference to FIG. 19.

In the following description, the sensors include an "absolute pressure sensor", a "blood pressure meter", and a "load sensor", and the sensor-side metadata includes the term "absolute pressure sensor" in sensor-side metadata 1 for the "absolute pressure sensor", the term "blood pressure meter" in sensor-side metadata 2 for the "blood pressure meter", and the term "load sensor" in sensor-side metadata 3 for the "load sensor". Also, the term "pressure sensor" is included as application-side metadata.

First, the relevancy calculation unit 131 searches the thesaurus 2 for related terms that are related to the term "absolute pressure sensor" in the sensor-side metadata 1.

Here, the related term "air pressure sensor" and the related term "temperature sensor" are found in the thesaurus 2 as related terms for the term "absolute pressure sensor" in the sensor-side metadata 1. The dissimilarity F is then calculated between the term "absolute pressure sensor" in the sensor-side metadata 1 and each of the related terms. The calculation results are as follows.

dissimilarity $F$(term "absolute pressure sensor"–related term "air pressure sensor")=0.20 dissimilarity $F$(term "absolute pressure sensor"–related term "temperature sensor")=0.40

Next, the relevancy calculation unit 131 searches the thesaurus 2 for related terms that are related to the term "blood pressure meter" in the sensor-side metadata 2. Here, the related term "pressure sensor", the related term "blood pressure monitor", and the related term "blood pressure sensor" are found in the thesaurus 2 as related terms for the term "blood pressure meter" in the sensor-side metadata 2. The dissimilarity F is then calculated between the term "blood pressure meter" in the sensor-side metadata 2 and each of the related terms. The calculation results are as follows.

dissimilarity $F$(term "blood pressure meter"–related term "pressure sensor")=0.50 dissimilarity $F$(term "blood pressure meter"–related term "blood pressure monitor")=0.10 dissimilarity $F$(term "blood pressure meter"–related term "blood pressure sensor")=0.10

Furthermore, the relevancy calculation unit 131 searches the thesaurus 2 for related terms that are related to the term "load sensor" in the sensor-side metadata 3. Here, the related term "strain gauge" and the related term "weight sensor" are found in the thesaurus 2 as related terms for the term "load sensor" in the sensor-side metadata 3. The dissimilarity F is then calculated between the term "load sensor" in the sensor-side metadata 3 and each of the related terms. The calculation results are as follows.

dissimilarity $F$(term "load sensor"–related term "strain gauge")=0.30 dissimilarity $F$(term "load sensor"–related term "weight sensor")=0.10

Furthermore, the relevancy calculation unit 131 searches the thesaurus 2 for related terms that are related to the term "pressure sensor" in the application-side metadata. Here, the related term "pressure meter", the related term "pressure gauge", the related term "pressure monitor", the related term "air pressure sensor", the related term "blood pressure meter", and the related term "strain gauge" are found in the thesaurus 2 as related terms for the term "pressure sensor" in the application-side metadata. The dissimilarity F is then calculated between the term "pressure sensor" in the application-side metadata and each of the related terms. The calculation results are as follows.

dissimilarity $F$(term "pressure sensor"–related term "pressure meter")=0.10 dissimilarity $F$(term "pressure sensor"–related term "pressure gauge")=0.10 dissimilarity $F$(term "pressure sensor"–related term "pressure monitor")=0.10 dissimilarity $F$(term "pressure sensor"–related term "air pressure sensor")=0.70 dissimilarity $F$(term "pressure sensor"–related term "blood pressure meter")=0.50 dissimilarity $F$(term "pressure sensor"–related term "strain gauge")=1.20

The sensor candidate extraction unit 132 then performs matching using, among the related terms, the related terms that are related to both the sensor-side metadata and the application-side metadata (the related terms that have a dissimilarity F value for both the sensor-side metadata and the application-side metadata) and the dissimilarity F values thereof. Specifically, the application-side metadata 1 and the sensor-side metadata 1 are related via the related term "air pressure sensor" ("air pressure sensor" is the common related term), the application-side metadata 1 and the sensor-side metadata 2 are related via the related terms "blood pressure meter" and "pressure sensor" ("blood pressure meter" and "pressure sensor" are common related terms), and the application-side metadata 3 and the sensor-side metadata 2 are related via the related term "strain gauge" ("strain gauge" is the common related term). Also, the sum values of the dissimilarity F that the related terms have with the sensor-side metadata and the application-side metadata are as shown below.

sum value of dissimilarity F for related term "air pressure sensor"

dissimilarity $F$(term "pressure sensor"–related term "air pressure sensor")+dissimilarity $F$(term "absolute pressure sensor"–related term "air pressure sensor")

=0.70+0.20

=0.90 sum value of dissimilarity F for related term "blood pressure meter"

dissimilarity $F$(term "pressure sensor"–related term "blood pressure meter")+dissimilarity $F$(term "blood pressure meter"–related term "blood pressure meter")

=0.50+0.0

=0.5 sum value of dissimilarity F for related term "strain gauge"

dissimilarity $F$(term "pressure sensor"–related term "strain gauge")+dissimilarity $F$(term "load sensor"–related term "strain gauge")

=1.20+0.30

=1.50

Next, upon arranging the sensor-side metadata terms in order of lowest sum value of dissimilarity F, the order is "blood pressure meter", "absolute pressure sensor", and "load sensor". In this example, the sensor candidate extraction unit 132 extracts all of the matching sensors, that is to say "blood pressure meter", "absolute pressure sensor", and "load sensor", as candidate sensors that can provide sensing data that satisfies an application's needs.

At this time, a priority ranking may be applied to the extracted "blood pressure meter", "absolute pressure sensor", and "load sensor". Then, this content may be presented to the application-side user by the sensor candidate presentation unit 133. FIG. 20 shows an example of presenting sensor candidates to the application-side user. In FIG. 20, "Sensor A" corresponding to "blood pressure meter" in the sensor-side metadata, "Sensor B" corresponding to "absolute pressure sensor" in the sensor-side metadata, and "Sensor C" corresponding to "load sensor" in the sensor-side metadata, which were extracted by the sensor candidate extraction unit 132, are presented in a list along with the priority ranks and the sum values of the dissimilarity F thereof. The application-side user can view the presented list of sensor candidates and selected a desired sensor.

Operations in First to Third Embodiments

Figure 21:
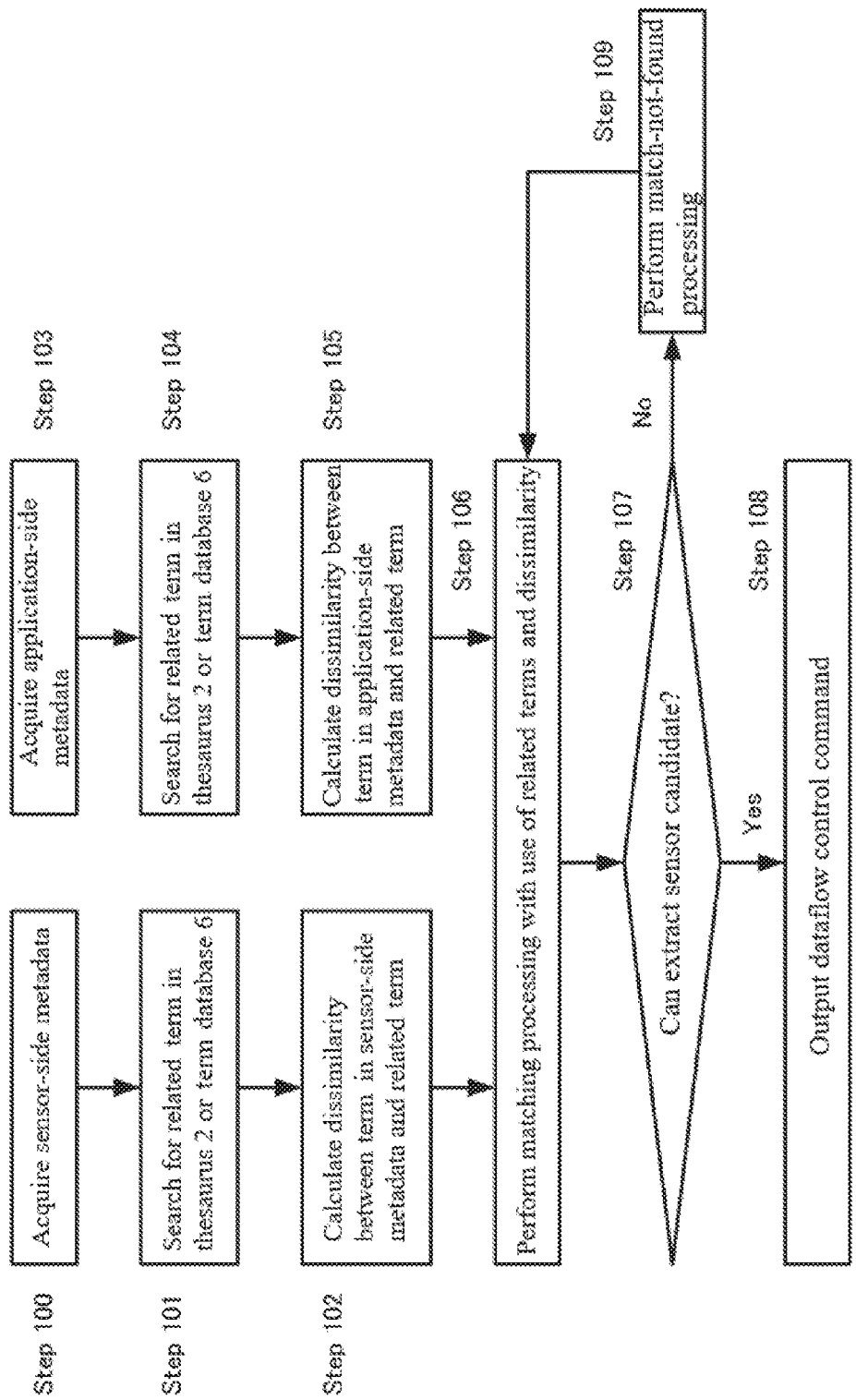
FIG. 21 is a flowchart of operations in the embodiments.
Figure 22:
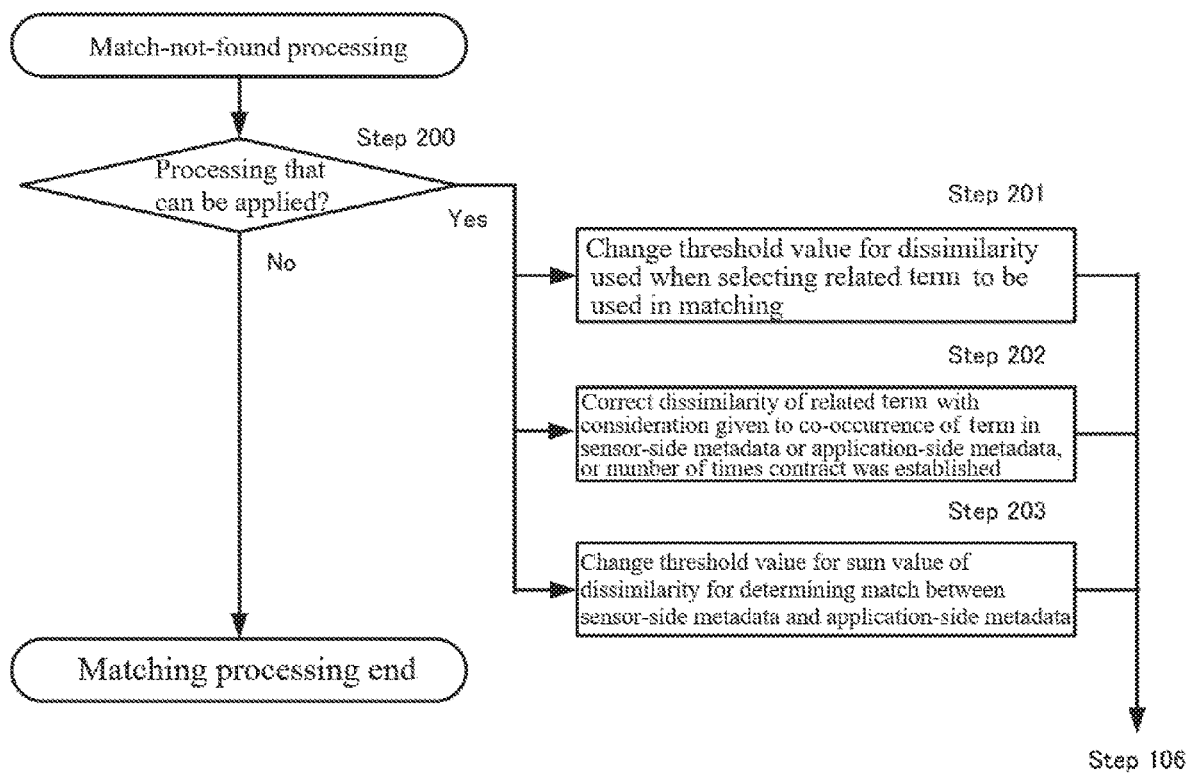
FIG. 22 is a flowchart of operations in the embodiments.

Next, operations in the above first to third embodiments will be described with reference to the flowcharts in FIGS. 21 and 22.

The sensor-side metadata acquisition unit 11 acquires sensor-side metadata (Step 100).

The relevancy calculation unit 131 searches the thesaurus 2 or the term database 6 for related terms that are related to the terms in the sensor-side metadata items (Step 101).

The relevancy calculation unit 131 calculates a dissimilarity F (including correction of the dissimilarity F) between the sensor-side metadata and the related terms (Step 102). Note that the relevancy calculation unit 131 does not need to calculate the dissimilarity F if the dissimilarity F can be obtained from the term database 6.

The application-side metadata acquisition unit 12 acquires application-side metadata (Step 103).

The relevancy calculation unit 131 searches the thesaurus 2 or the term database 6 for related terms that are related to terms in the application-side metadata items (Step 104).

The relevancy calculation unit 131 calculates a dissimilarity F (including correction of the dissimilarity F) between the application-side metadata and the related terms (Step 105). Note that the relevancy calculation unit 131 does not need to calculate the dissimilarity F if the dissimilarity F can be obtained from the term database 6.

The sensor candidate extraction unit 132 performs processing for matching between the sensor-side metadata and the application-side metadata based on the found related terms and the calculated dissimilarity F values thereof obtained by the relevancy calculation unit 131 (Step 106). Specific processing for matching has been described above.

If there is a match between sensor-side metadata and application-side metadata (Step 107 Yes), the dataflow control command instruction unit 14 outputs a dataflow control command (Step 108). Note that the following cases are examples of triggers for the output of the dataflow control command by the dataflow control command instruction unit 14, as described above.

(1) Case where the matching unit 13 determines, based on a predetermined condition, that there is a match between sensor-side metadata and application-side metadata (2) Case where the sensor candidate presentation unit 133 of the matching unit 13 presents, to the application-side user, a matching result between sensor-side metadata and application-side metadata obtained, and the application-side user desires, based on the matching result, the provision of sensing data The above cases are merely examples, and there is no limitation to the above cases.

However, if there is no match between the sensor-side metadata and the application-side metadata (Step 107 No), match-not-found processing is performed (Step 109).

The following describes match-not-found processing.

In match-not-found processing, it is determined whether or not there is other processing that can be applied (Step 200). If any of the following processing can be applied, such processing is performed.

First modified example and second modified example of first embodiment: change threshold value (range) of dissimilarity F used when selecting related terms that are to be used in matching (Step 201)

Second embodiment: correct (adjust) dissimilarity F of related term with consideration given to co-occurrence of term in sensor-side metadata or application-side metadata, number of times a contract was established, or the like (Step 202)

Third embodiment: change threshold value (range) of sum value of dissimilarity F for determining match between sensor-side metadata and application-side metadata (Step 203).

At least one of the above processing is performed, and then processing for matching between sensor-side metadata and application-side metadata is performed again (Step 106).

However, if there is no processing that can be applied, match-not-found processing is ended.

Note that although the example of performing the second embodiment (Step 202) is described as other processing that can be applied in match-not-found processing, it goes without saying that the related term dissimilarity F may be corrected (adjusted) in the first matching processing step (Step 106).

Also, the relevancy is not limited to being the dissimilarity F, and need only be an indicator of relevancy between terms.

This concludes the description of operations in the first to third embodiments.

Figure 23:
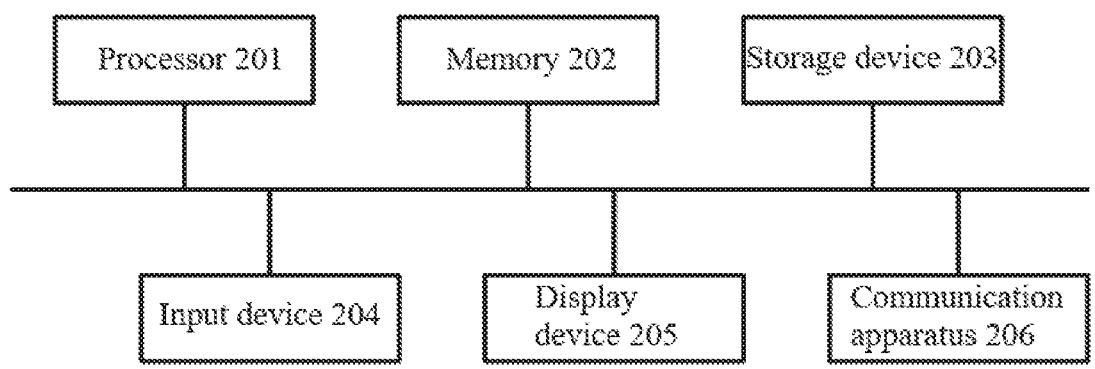
FIG. 23 is another configuration diagram of an embodiment.

Note that as shown in FIG. 23, the matching apparatus 1 can be configured by a general-purpose computer that has hardware resources such as a processor 201, a memory (ROM or RAM) 202, a storage device (hard disk, semiconductor disk, or the like) 203, an input device (keyboard, mouse, touch panel, or the like) 204, a display device 205, and a communication apparatus 206. The functions of the matching apparatus 1 are realized by a program stored in the storage device 203 being loaded to the memory 202 and executed by the processor 201. Note that the matching apparatus 1 may be configured by one computer, or may be configured by distributed computing with use of multiple computers. Also, in order to increase the processing speed, some or all of the functions of the matching apparatus 1 can also be realized using dedicated hardware (e.g., a GPU, an FPGA, or an ASIC).

Also, part or all of the above embodiments can be described as noted below, but there is no limitation to this.

Note 1

A matching apparatus having at least one or more hardware processor, the processor acquiring sensor-side metadata that is information regarding a sensor that outputs sensing data;

acquiring application-side metadata that is information regarding an application that provides a service with use of the sensing data;

performing matching between the sensor-side metadata and the application-side metadata in which a first related term that is related to a term in the acquired sensor-side metadata and a second related term that is related to a term in the acquired application-side metadata are in common with each, and extracting a candidate sensor that can provide sensing data that matches needs of the application; and transmitting, to a sensor management apparatus that manages the sensor, a dataflow control command that includes information that specifies the extracted sensor and the application.

Note 2

A matching method in which a computer acquires sensor-side metadata that is information regarding a sensor that outputs sensing data;

acquires application-side metadata that is information regarding an application that provides a service with use of the sensing data;

performs matching between the sensor-side metadata and the application-side metadata in which a first related term that is related to a term in the acquired sensor-side metadata and a second related term that is related to a term in the acquired application-side metadata are in common with each, and extracts a candidate sensor that can provide sensing data that matches needs of the application; and transmits, to a sensor management apparatus that manages the sensor, a dataflow control command that includes information that specifies the extracted sensor and the application.

Note 3

A recording medium having stored thereon a program that causes a computer to execute:

a process of acquiring sensor-side metadata that is information regarding a sensor that outputs sensing data;

a process of acquiring application-side metadata that is information regarding an application that provides a service with use of the sensing data;

a process of performing matching between the sensor-side metadata and the application-side metadata in which a first related term that is related to a term in the acquired sensor-side metadata and a second related term that is related to a term in the acquired application-side metadata are in common with each, and extracting a candidate sensor that can provide sensing data that matches needs of the application; and a process of transmitting, to a sensor management apparatus that manages the sensor, a dataflow control command that includes information that specifies the extracted sensor and the application.

Although the present invention has been described by way of preferred embodiments and modified examples above, it is not necessary to include the configurations of all of the embodiments or modified examples, and not only is implementation by appropriate combinations possible, but also the present invention is not necessarily limited to the above embodiments and modified examples, and various modifications can be made within the scope of the technical idea.

INDEX TO THE REFERENCE NUMERALS 1 matching apparatus
2 thesaurus
3 sensor data providing system
4 data distribution control apparatus
5 application system
6 term database
11 sensor-side metadata acquisition unit
12 application-side metadata acquisition unit
13 matching unit
14 dataflow control command instruction unit
131 relevancy calculation unit
132 sensor candidate extraction unit
133 sensor candidate presentation unit
134 relevancy threshold value setting unit
135 term database updating unit
201 processor
202 memory
203 storage device
204 input device
205 display device
206 communication apparatus

The invention claimed is:

1. A matching apparatus comprising a processor configured with a program to perform operations comprising:
operation as a sensor-side metadata acquisition unit that acquires sensor-side metadata comprising information regarding a sensor that outputs sensing data;
operation as an application-side metadata acquisition unit that acquires application-side metadata comprising information regarding an application that provides a service with use of the sensing data;
operation as a matching unit that performs matching between the sensor-side metadata and the application-side metadata in which a first related term that is related to a term in the acquired sensor-side metadata and a second related term that is related to a term in the acquired application-side metadata are in common with each other, and extracts a candidate sensor that provides sensing data that matches needs of the application, wherein operation as the matching unit comprises:
operation as a relevancy calculation unit that calculates at least either one of a first relevancy between the term in the sensor-side metadata and the first related term and a second relevancy between the term in the application-side metadata and the second related term; and
operation as a sensor candidate extraction unit that, with the use of at least either one of the first related term and the first relevancy or the second related term and the second relevancy, performs matching between the sensor-side metadata and the application-side metadata, and extracts the candidate sensor that can provide sensing data that matches needs of the application; and
operation as an instruction unit that transmits, to a sensor management apparatus that manages the sensor, a dataflow control command that includes information that specifies the sensor extracted by the matching unit and the application.

2. The matching apparatus according to claim 1,
wherein the processor is configured with the program such that operation as the sensor candidate extraction unit comprises performing matching between the sensor-side metadata and the application-side metadata with use of the first related term having a first relevancy that is in a predetermined range and the first relevancy, or with use of the second related term having a second relevancy that is in a predetermined range and the second relevancy.

3. The matching apparatus according to claim 2, wherein the processor is configured with the program to perform operations further comprising:
operation as a range setting unit that sets the predetermined range of the first relevancy to be used with respect to the first related term, or the predetermined range of the second relevancy to be used with respect to the second related term.

4. The matching apparatus according to claim 3,
wherein the processor is configured with the program such that, in a case where a contract is established with an application-side user through matching, operation as the range setting unit comprises setting, as a range of relevancy of a related term to be used in subsequent matching processing, a range of relevancy of a related term that was used when the contract was established.

5. The matching apparatus according to claim 4,
wherein the processor is configured with the program such that operation as the sensor candidate extraction unit comprises correcting the first relevancy or the second relevancy with consideration given to co-occurrence with the term in the sensor-side metadata or the application-side metadata.

6. The matching apparatus according to claim 4,
wherein in a case where the term in the sensor-side metadata and the first related term or the term in the application-side metadata and the second related term were previously used in matching and a contract was established with an application-side user through the matching, the processor is configured with the program such that operation as the sensor candidate extraction unit comprises correcting the first relevancy or the second relevancy according to a frequency of the contract establishment.

7. The matching apparatus according to claim 2,
wherein the processor is configured with the program such that operation as the sensor candidate extraction unit comprises correcting the first relevancy or the second relevancy with consideration given to co-occurrence with the term in the sensor-side metadata or the application-side metadata.

8. The matching apparatus according to claim 2,
wherein in a case where the term in the sensor-side metadata and the first related term or the term in the application-side metadata and the second related term were previously used in matching and a contract was established with an application-side user through the matching, the processor is configured with the program such that operation as the sensor candidate extraction unit comprises correcting the first relevancy or the second relevancy according to a frequency of the contract establishment.

9. The matching apparatus according to claim 2, wherein the processor is configured with the program to perform operations further comprising:
operation as a term database in which a term used in the sensor-side metadata or the application-side metadata, a related term that is related to the term, and a relevancy between the term and the related term are stored in association with each other; and
operation as a term database updating unit that updates the term database with use of a term of the sensor-side metadata or the application-side metadata that was newly used in matching, the first or second related term, or the first or second relevancy that was newly calculated.

10. The matching apparatus according to claim 3,
wherein the processor is configured with the program such that operation as the sensor candidate extraction unit comprises correcting the first relevancy or the second relevancy with consideration given to co-occurrence with the term in the sensor-side metadata or the application-side metadata.

11. The matching apparatus according to claim 3,
wherein in a case where the term in the sensor-side metadata and the first related term or the term in the application-side metadata and the second related term were previously used in matching and a contract was established with an application-side user through the matching, the processor is configured with the program such that operation as the sensor candidate extraction unit comprises correcting the first relevancy or the second relevancy according to a frequency of the contract establishment.

12. The matching apparatus according to claim 3, wherein the processor is configured with the program to perform operations further comprising:
operation as a term database in which a term used in the sensor-side metadata or the application-side metadata, a related term that is related to the term, and a relevancy between the term and the related term are stored in association with each other; and
operation as a term database updating unit that updates the term database with use of a term of the sensor-side metadata or the application-side metadata that was newly used in matching, the first or second related term, or the first or second relevancy that was newly calculated.

13. The matching apparatus according to claim 1,
wherein the processor is configured with the program such that operation as the sensor candidate extraction unit comprises correcting the first relevancy or the second relevancy with consideration given to co-occurrence with the term in the sensor-side metadata or the application-side metadata.

14. The matching apparatus according to claim 13,
wherein in a case where the term in the sensor-side metadata and the first related term or the term in the application-side metadata and the second related term were previously used in matching and a contract was established with an application-side user through the matching, the processor is configured with the program such that operation as the sensor candidate extraction unit comprises correcting the first relevancy or the second relevancy according to a frequency of the contract establishment.

15. The matching apparatus according to claim 1,
wherein the processor is configured with the program such that, in a case where the term in the sensor-side metadata and the first related term or the term in the application-side metadata and the second related term were previously used in matching and a contract was established with an application-side user through the matching, operation as the sensor candidate extraction unit comprises correcting the first relevancy or the second relevancy according to a frequency of the contract establishment.

16. The matching apparatus according to claim 1, further comprising:
operation as a term database in which a term used in the sensor-side metadata or the application-side metadata, a related term that is related to the term, and a relevancy between the term and the related term are stored in association with each other; and
operation as a term database updating unit that updates the term database with use of a term of the sensor-side metadata or the application-side metadata that was newly used in matching, the first or second related term, or the first or second relevancy that was newly calculated.

17. The matching apparatus according to claim 1, wherein the processor is configured with the program to perform operations further comprising:

operation as a sensor candidate presentation unit that presents information regarding the extracted candidate sensor to the application-side user.

18. A matching method comprising:

acquiring sensor-side metadata comprising information regarding a sensor that outputs sensing data;

acquiring application-side metadata comprising information regarding an application that provides a service with use of the sensing data;

performing matching between the sensor-side metadata and the application-side metadata in which a first related term that is related to a term in the acquired sensor-side metadata and a second related term that is related to a term in the acquired application-side metadata are in common with each, and extracting a candidate sensor that can provide sensing data that matches needs of the application;

calculating at least either one of a first relevancy between the term in the sensor-side metadata and the first related term and a second relevancy between the term in the application-side metadata and the first related term and a second relevancy between the term in the application-side metadata and the second related term;

with the use of at least either one of the first related term and the first relevancy or the second related term and the second relevancy, performing matching between the sensor-side metadata and the application-side metadata, and extracting the candidate sensor that can provide sensing data that matches needs of the application; and transmitting, to a sensor management apparatus that manages the sensor, a dataflow control command that includes information that specifies the extracted sensor and the application.

19. A non-transitory computer-readable storage medium storing a program that causes a computer to perform processes comprising:

a process of acquiring sensor-side metadata comprising information regarding a sensor that outputs sensing data;

a process of acquiring application-side metadata comprising information regarding an application that provides a service with use of the sensing data;

a process of performing matching between the sensor-side metadata and the application-side metadata in which a first related term that is related to a term in the acquired sensor-side metadata and a second related term that is related to a term in the acquired application-side metadata are in common with each, and extracting a candidate sensor that can provide sensing data that matches needs of the application;

a process of calculating at least either one of a first relevancy between the term in the sensor-side metadata and the first related term and a second relevancy between the term in the application-side metadata and the first related term and a second relevancy between the term in the application-side metadata and the second related term;

a process of, with the use of at least either one of the first related term and the first relevancy or the second related term and the second relevancy, performing matching between the sensor-side metadata and the application-side metadata, and extracting the candidate sensor that can provide sensing data that matches needs of the application; and a process of transmitting, to a sensor management apparatus that manages the sensor, a dataflow control command that includes information that specifies the extracted sensor and the application.

* * * * *